(12) United States Patent
Loncarevic

(10) Patent No.: US 10,396,570 B2
(45) Date of Patent: Aug. 27, 2019

(54) BATTERY MANAGEMENT SYSTEM WITH TEMPERATURE SENSING AND CHARGE MANAGEMENT FOR INDIVIDUAL SERIES-CONNECTED BATTERY CELLS

(71) Applicant: LITHIUM BALANCE A/S, Ishoj (DK)

(72) Inventor: Ivan Loncarevic, Bronshoj (DK)

(73) Assignee: LITHIUM BALANCE A/S, Ishoj (DK)

( * ) Notice: Subject to any disclaimer, the term of this patent is extended or adjusted under 35 U.S.C. 154(b) by 354 days.

(21) Appl. No.: 13/735,946

(22) Filed: Jan. 7, 2013

(65) Prior Publication Data
US 2013/0207613 A1    Aug. 15, 2013

Related U.S. Application Data

(63) Continuation of application No. 12/514,058, filed as application No. PCT/DK2007/000492 on Nov. 12, 2007, now Pat. No. 8,350,529.

(30) Foreign Application Priority Data

Nov. 10, 2006 (EP) ...................... 06388061

(51) Int. Cl.
*H02J 7/00* (2006.01)

(52) U.S. Cl.
CPC .................. *H02J 7/0016* (2013.01)

(58) Field of Classification Search
CPC .... H02J 7/00; H02J 7/0031; H02J 2007/0037; H02J 2007/004; Y02E 60/12; H01M 10/48

(Continued)

(56) References Cited

U.S. PATENT DOCUMENTS 5,283,512 A * 2/1994 Stadnick ............... H02J 7/0016
320/101
5,315,228 A * 5/1994 Hess .................. G01R 31/3648
320/106

(Continued)

FOREIGN PATENT DOCUMENTS

EP      1289096     3/2003
GB      2420235     5/2006

(Continued)

OTHER PUBLICATIONS

International Search Report on corresponding PCT application (PCT/DK2007/000492) from International Searching Authority (EPO) dated Mar. 4, 2008.

(Continued)

*Primary Examiner* — Richard Isla
*Assistant Examiner* — Mohammed J Sharief
(74) *Attorney, Agent, or Firm* — Klein, O'Neill & Singh, LLP

(57) ABSTRACT

A method and apparatus are disclosed for a Battery Management System (BMS) for the controlling of the charging and discharging of a plurality of battery cells (12). Each battery cell has an associated plurality of control circuits (32, 36) which monitor and control the charging of individual battery cells. These units are controlled by a central microcontroller (14) which shunts current around the battery cell if fully charged and stops discharge if a battery cell is fully discharged in order to prevent damage to the other cells.

20 Claims, 15 Drawing Sheets

(58) Field of Classification Search
USPC .......................................................... 320/134
See application file for complete search history.

(56) References Cited

U.S. PATENT DOCUMENTS

| | | | | |
|---|---|---|---|---|
| 5,316,868 | A * | 5/1994 | Dougherty | H01M 10/0413 429/62 |
| 5,504,415 | A | 4/1996 | Podrazhansky et al. | |
| 5,578,914 | A | 11/1996 | Morita | |
| 5,616,868 | A * | 4/1997 | Hagenmeyer | G01F 1/8409 73/861.355 |
| 5,623,195 | A * | 4/1997 | Bullock | H01M 10/443 320/153 |
| 5,656,915 | A * | 8/1997 | Eaves | H01M 10/482 320/118 |
| 5,747,964 | A * | 5/1998 | Turnbull | H01M 10/441 320/124 |
| 5,764,027 | A * | 6/1998 | Harvey | B60L 11/1851 320/106 |
| 5,767,659 | A * | 6/1998 | Farley | H01M 10/46 320/106 |
| 5,811,959 | A * | 9/1998 | Kejha | H02J 7/0018 320/126 |
| 5,864,220 | A * | 1/1999 | Reipur | H01M 10/4257 320/134 |
| 5,965,996 | A | 10/1999 | Arledge et al. | |
| 6,008,627 | A * | 12/1999 | Narita | H01M 2/34 320/134 |
| 6,014,013 | A | 1/2000 | Suppanz et al. | |
| 6,018,804 | A * | 1/2000 | George | H04N 5/63 348/E5.127 |
| 6,304,062 | B1 * | 10/2001 | Batson | G01R 1/203 320/134 |
| 6,819,083 | B1 * | 11/2004 | Patino | H02J 7/0091 320/134 |
| 6,882,129 | B2 | 4/2005 | Boskovitch et al. | |
| 6,924,621 | B2 * | 8/2005 | Jabaji | H02J 7/0031 320/104 |
| 7,592,773 | B2 | 9/2009 | Pellenc | |
| 7,880,432 | B2 | 2/2011 | Yun et al. | |
| 2003/0042870 | A1 | 3/2003 | Yau et al. | |
| 2005/0134230 | A1 * | 6/2005 | Sato | H01M 10/4264 320/136 |
| 2005/0156573 | A1 * | 7/2005 | Lin | H02J 7/0031 320/134 |
| 2005/0280398 | A1 * | 12/2005 | Lee | H01M 10/46 320/134 |
| 2006/0091854 | A1 | 5/2006 | Chen et al. | |
| 2006/0186857 | A1 * | 8/2006 | Matty | H01M 10/44 320/122 |
| 2008/0084182 | A1 | 4/2008 | Oberlin et al. | |
| 2012/0200968 | A1 * | 8/2012 | Altemose | H02J 7/0026 361/86 |

FOREIGN PATENT DOCUMENTS

WO     WO 99/32323     7/1999
WO     WO2006068429     6/2006

OTHER PUBLICATIONS

Written Opinion on corresponding PCT application (PCT/DK2007/000492) from International Searching Authority (EPO) dated Mar. 4, 2008.

* cited by examiner

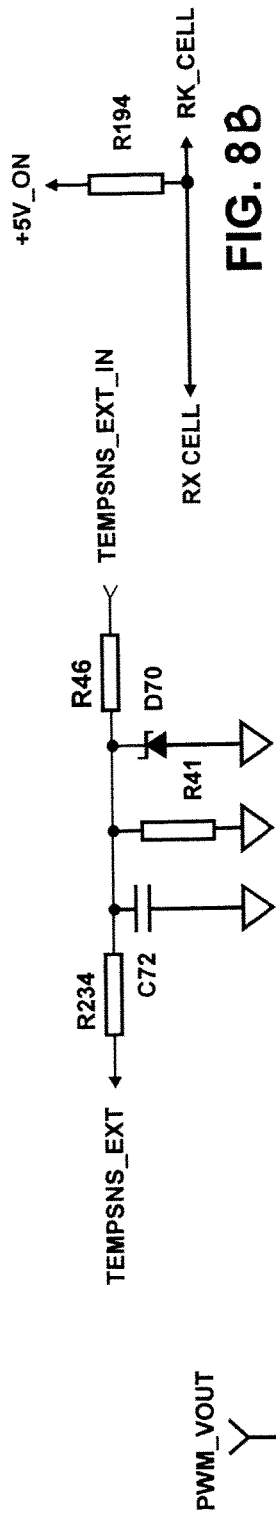
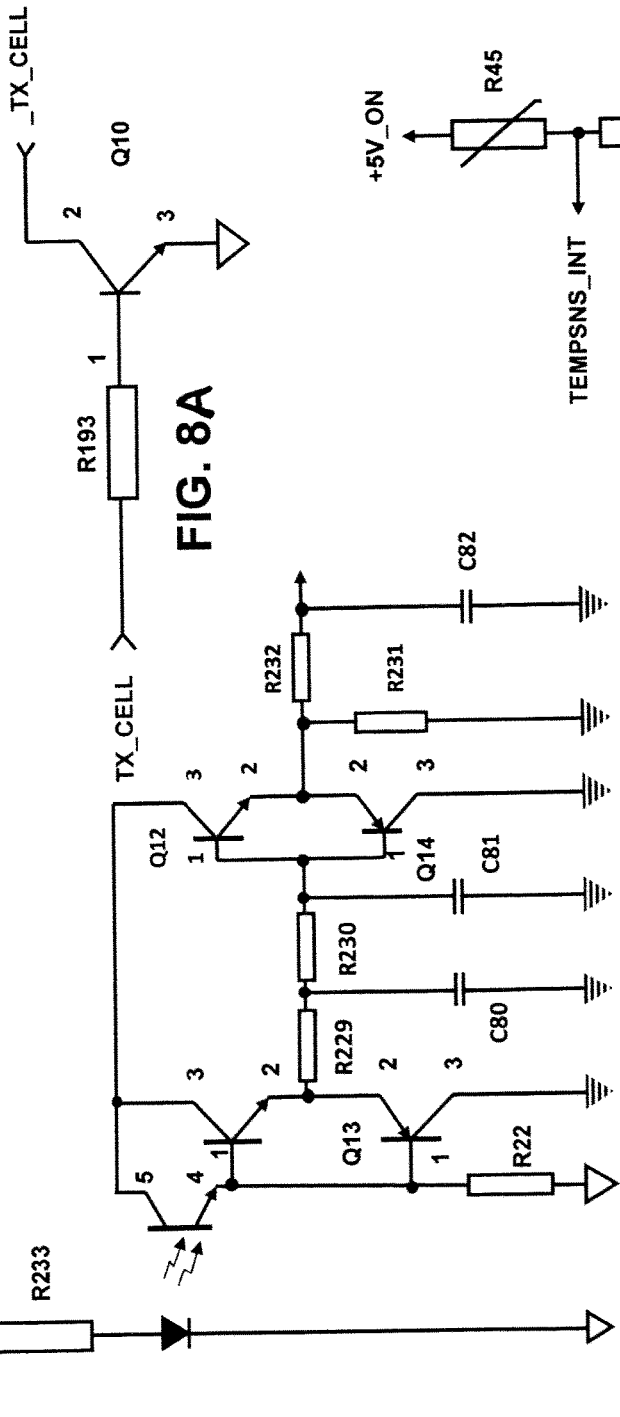

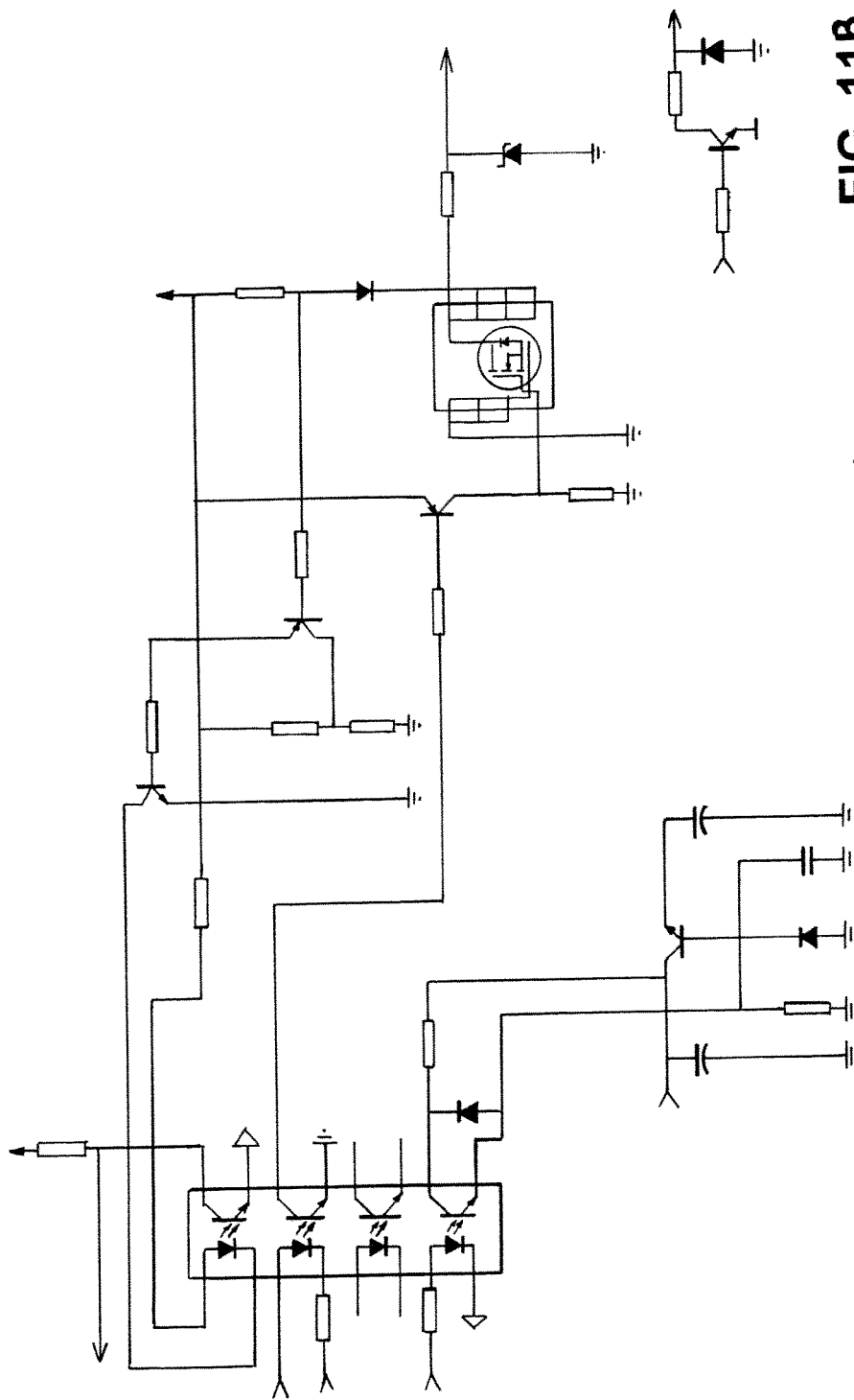

BATTERY MANAGEMENT SYSTEM WITH TEMPERATURE SENSING AND CHARGE MANAGEMENT FOR INDIVIDUAL SERIES-CONNECTED BATTERY CELLS

CROSS-REFERENCE TO RELATED APPLICATION

This application is a continuation of co-pending U.S. patent application Ser. No. 12/514,058, filed on May 7, 2009, now U.S. Pat. No. 8,350,529, which is a national phase filing, under 35 U.S.C. § 371(c), of International Application No. PCT/DK2007/000492, filed Nov. 12, 2007, the disclosure of which is incorporated herein by reference in its entirety.

TECHNICAL FIELD

The present invention relates to systems and methods for controlling charging and discharging battery cells such as lithium ion cells.

BACKGROUND OF THE INVENTION

The introduction of rechargeable lithium ion batteries opens new possibilities of performances. Lithium technologies offer several advantages where maximum operating time and battery cycles life is required over wide temperature range, coupled with compact size and minimum weight. This technology needs strict charge and discharge criteria. Protection and detection against abusive conditions is here a demand. A BMS (Battery Management System) is to be developed in order to fulfil these demands.

SUMMARY OF THE INVENTION

On the above background it is an object of the present invention to provide a battery management system (BMS) that ensures optimal charge and discharge conditions for each of the individual lithium cells and protects the lithium cells from any abusive conditions such as overload and/or short circuit.

These and other objects and advantages are according to the invention attained by a battery management system (BMS) for the controlling and monitoring of a plurality of lithium ion cells or similar battery cells including lithium molybdenum, nickel, cadmium and PB cells, the BMS including a central controlling microcontroller and a plurality of control circuits connected with a respective battery cell and serving to individually monitoring the charging of the individual respective battery cell and at the time of reaching a maximum charging state establishing a shunt across the individual battery cell for allowing a continued charging of the remaining battery cells and at the same time communicating to the central controlling microcontroller a message representing that the maximum charging state has been reached and serving during discharging of the battery to monitor the state of the individual respective battery cell and to inform the central controlling microcontroller in case a minimum charging state has been reached for causing the central controlling microcontroller to disconnect the battery from the load in order to prevent excessive discharging of the individual battery cells.

According to a specific embodiment of the invention said BMS comprises temperature sensors for continuous monitoring of the temperature in the device, means to shut down the charging/discharging in case of overload/short circuit, current monitoring by means of a shunt resistor, fuse protection of the device in case of overload/short circuit, a power supply for the control unit and a fuel gauge.

The above and other objects and advantages are furthermore according to the invention attained by a method for controlling and monitoring a plurality of lithium ion cells or similar battery cells including lithium molybdenum, nickel, cadmium and PB cells, the method comprising:

during charging of said cells:
adjusting the voltage/current with respect to the cell condition to achieve optimum charge performance and bypassing one or more individual cells for allowing continuous charging of the remaining cells when said one or more individual cells has reached the top voltage;

during discharging of said cells
the voltage of each individual cell is monitored until a minimum value has been reached in one or more individual cells at which time all the cells are shut down to prevent the lithium ion cell having reached the minimum voltage level to be ruined by continuous discharging;

thereby ensuring the highest performance of the battery maximum safety during charging and discharging.

The present invention furthermore relates to a battery management system (BMS) of a modular design, where the system can be adapted to different numbers and physical placements of rechargeable cells. In a modular system according to the invention circuits/functions common to all cells are thus provided centrally, for instance on a single PCB or otherwise, whereas individual cells can be provided with corresponding control systems comprising cell balancing means and/or slave sensor means, the individual control systems being either of a type common for all cells in the system or individually adapted to each individual cell. The control systems at the individual cells can communicate with the central circuits of the system by wired connections, e.g. an analogue connection or a digital communication bus according to the specific implementation of the system. It would, however, alternatively be possible to provide communication between the individual cell control systems and the central parts of the system by wireless communication means, hence increasing the flexibility of the entire set-up even further.

In the following detailed description of the invention the concepts of the invention will be illustrated by reference to two specific embodiments of the invention, but it is understood that the scope of the invention is not limited to those embodiments. Even though the embodiments shown and described in the detailed description of the invention relate to a specific number of cells and to specific voltages over each individual cell and over the entire batter the invention is not limited to these specific numerical values. In fact any number of individual cells may be included in the system and method of the invention.

BRIEF DESCRIPTION OF THE DRAWINGS

The present invention will be better understood with reference to the following detailed description of embodiments of the invention taken in conjunction with the figures, where:

FIGS. 8A, 8B, 8C, 8D, and 8E show schematic views, respectively, of a supply part for the communication bus, an internal temperature sensor, an external temperature sensor and an output fuel gauge from the second embodiment of a BMS (Battery Management System) according to the present invention;

FIGS. 11A, 11B, and 11C show a schematic view of a single wire bus from the second embodiment of a BMS (Battery Management System) according to the present invention;

DETAILED DESCRIPTION OF THE INVENTION

Figure 1:
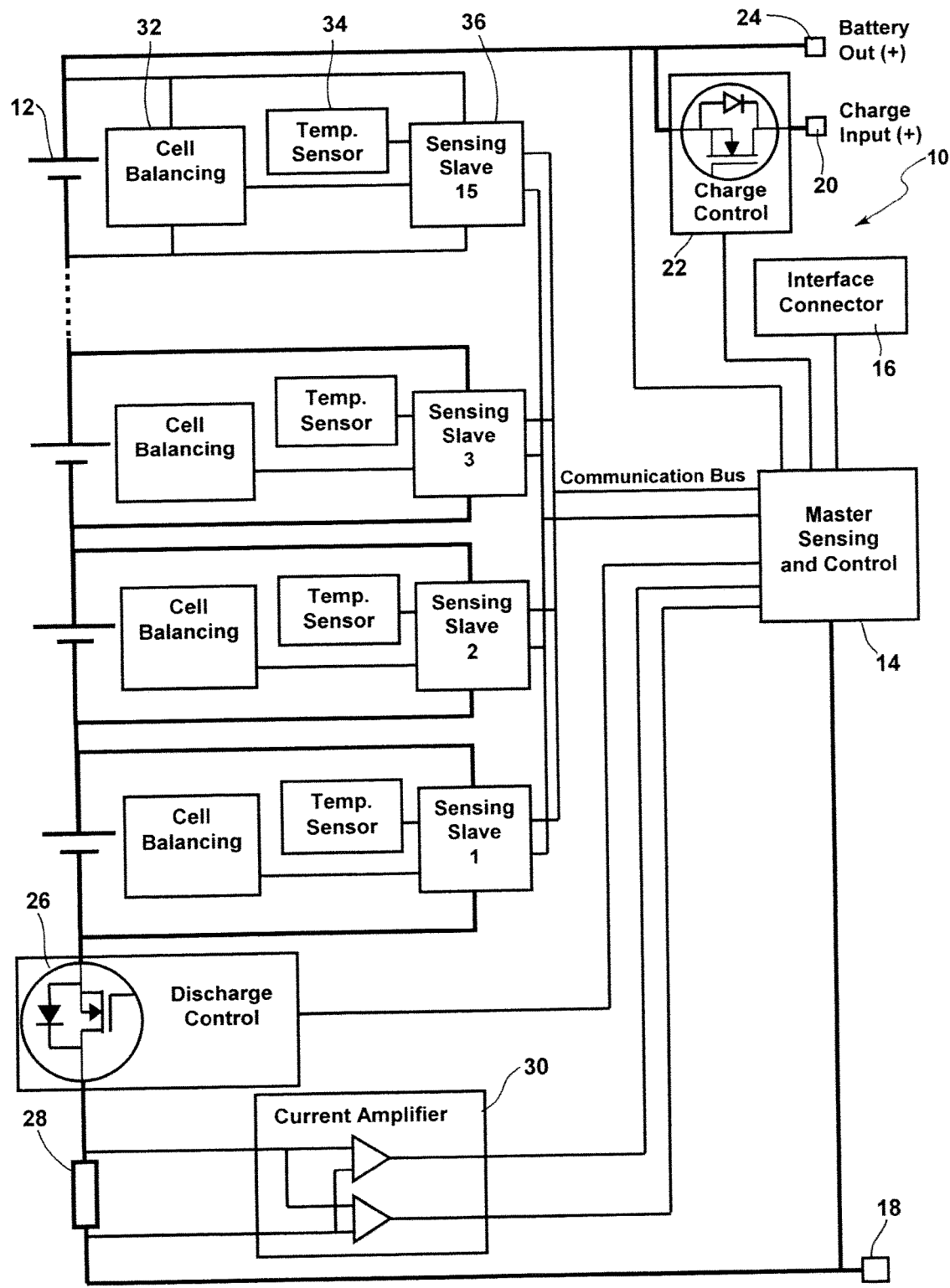
FIG. 1 shows a schematic block diagram of a first embodiment of a BMS (Battery Management System) according to the present invention.

Referring to FIG. 1 there is shown a schematic block diagram of a first embodiment of the battery management system or BMS according to the invention, which is shown connected to a plurality of lithium ion cells, in the embodiment shown in FIG. 1 a total of 15 lithium ion cells. One of the lithium ion cells is designated the reference numeral 12 and the BMS is in its entirety designated the reference numeral 10.

The BMS centrally includes a master microcontroller performing the overall sensing and control of the BMS, which central microcontroller is designated the reference numeral 14. The microcontroller 14 is connectable to external equipment such as an external PC through an interface connector 16. The BMS is connected to a common ground connector or terminal 18 and is connected to a charge input connector or terminal 20 through a charge control MOSFET 22 serving to separate the charge input connector from a battery output connector 24 constituting the positive output terminal of the battery system relative to the common ground connector or terminal 18.

The series configuration of the 15 lithium ion cells defines a positive terminal which is connected to the junction between the battery output terminal or connector 24 and the battery voltage sensor terminal of the charge control MOSFET 22. The negative terminal of the series configuration of the 15 lithium ion cells is connected through a series configuration of a discharge control MOSFET 26 and low ohm resistor to the common ground connector or terminal 18. The voltage across the low ohm resistor 28 is sensed by current amplifier delivering an output voltage in response to an excessive current passing through the low ohm resistor 28 for informing the central master microcontroller 14 of the occurrence of an excessive current load through the series configuration of the 15 lithium ion cells. The discharge controlling MOSFET 26 is controlled by the central master microcontroller 14 and is used for a shut down of the supply of current from the lithium ion cells as will be described below.

As a particular feature of the BMS according to the present invention each lithium ion cell is connected to a separate monitoring and controlling circuit including for each lithium ion cell a cell balancing circuit 32, a temperature sensor 34 and a communication or sensing slave circuit 36 establishing communication from the cell balancing circuit 32 and the temperature sensor to and from the central master microcontroller 14. The cell balancing circuit 32 basically serves to monitor the voltage across the lithium ion cell during charging and in case the lithium ion cell connected to the cell balancing circuit in question has reached the top voltage and the master microcontroller 14 is still controlling the BMS into continuous charging of the remaining lithium ion cells, the cell balancing circuit 32 shunts the lithium ion cell for allowing the continuous charging of the remaining lithium ion cells.

The temperature sensor 34 serves to monitor if an excessive temperature is reached in the lithium ion cell and/or in the cell balancing and sensing slave circuits 32 and 36, respectively, and the sensing slave circuit 36 serves during discharging of the lithium ion cell to monitor the discharging of the lithium ion cell to a minimum at which time the sensing slave circuit 36 informs the master microcontroller 14 of the occurrence of a complete discharging of one of the cells causing the master microcontroller 14 to shut down the whole circuitry in order to prevent the lithium ion cell having reached the minimum voltage level to be ruined by continuous discharging of the lithium ion cell.

Figure 2:
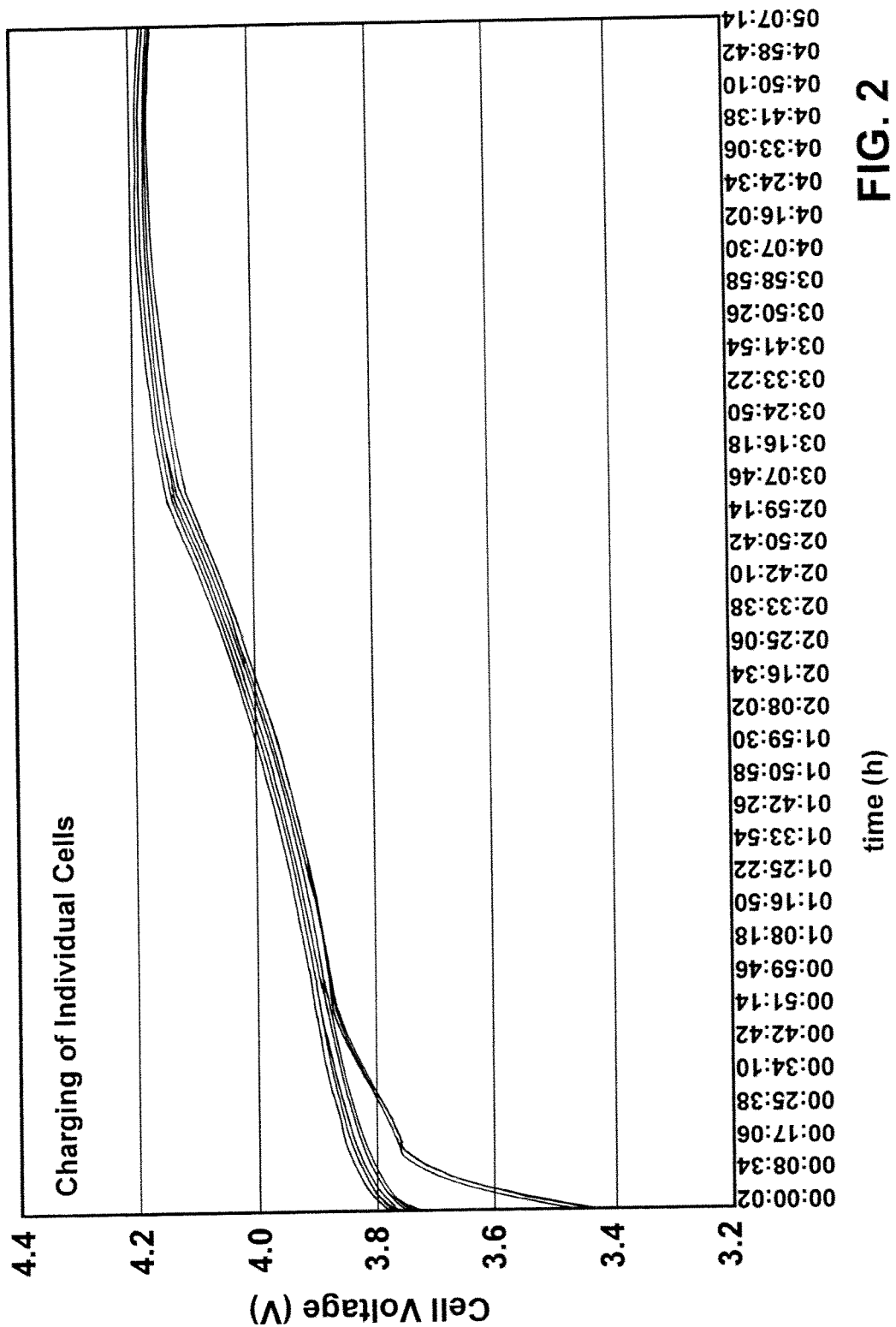
FIG. 2 shows a diagrammatic view illustrating the charging of a 14 cell lithium ion battery when using the BMS of FIG. 1.

Referring to FIG. 2 there is shown a diagram illustrating the advantageous charging of a total of 14 cells by the use of the BMS as shown in FIG. 1, however, modified into communicating with 14 lithium ion cells rather than 15 lithium ion cells as illustrated in FIG. 1. From FIG. 2 it is evident that the individual lithium ion cells are charged simultaneously to the same maximum level of approximately 4.2V.

Figure 3:
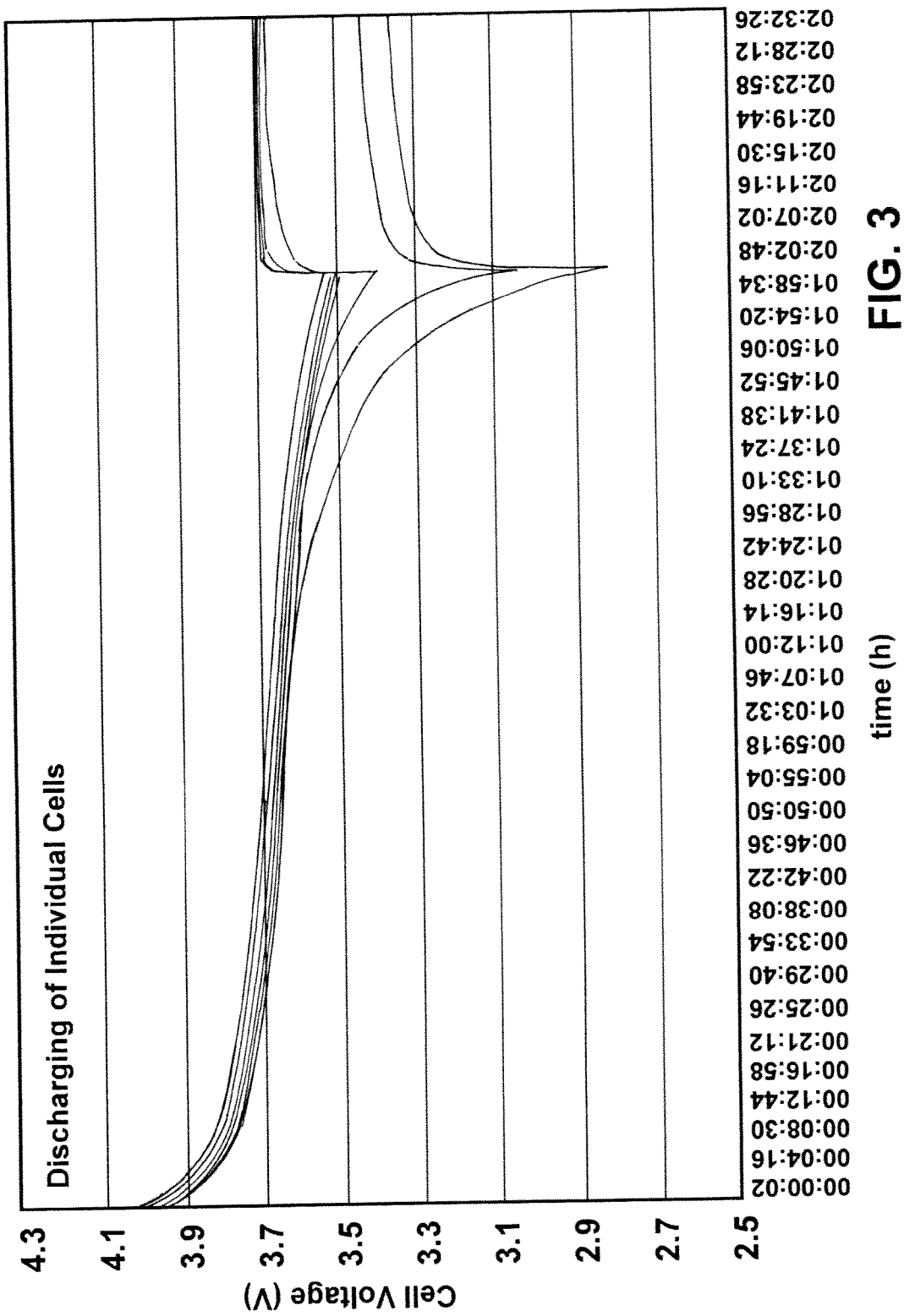
FIG. 3 shows a diagrammatic view similar to the view of FIG. 2 of the discharging of the 14 cell lithium ion battery when using the BMS of FIG. 1.

Referring to FIG. 3 there is shown a diagram illustrating the advantageous discharging and control of a total of 14 cells by the use of the BMS as shown in FIG. 1, however, modified into communicating with 14 lithium ion cells rather than 15 lithium ion cells as illustrated in FIG. 1. From FIG. 2 it is evident that of each of the individual cells is monitored and the battery as a whole is allowed to be shut down at the time a single lithium ion cell reaches the minimum voltage level of 2.8V.

Figure 4:
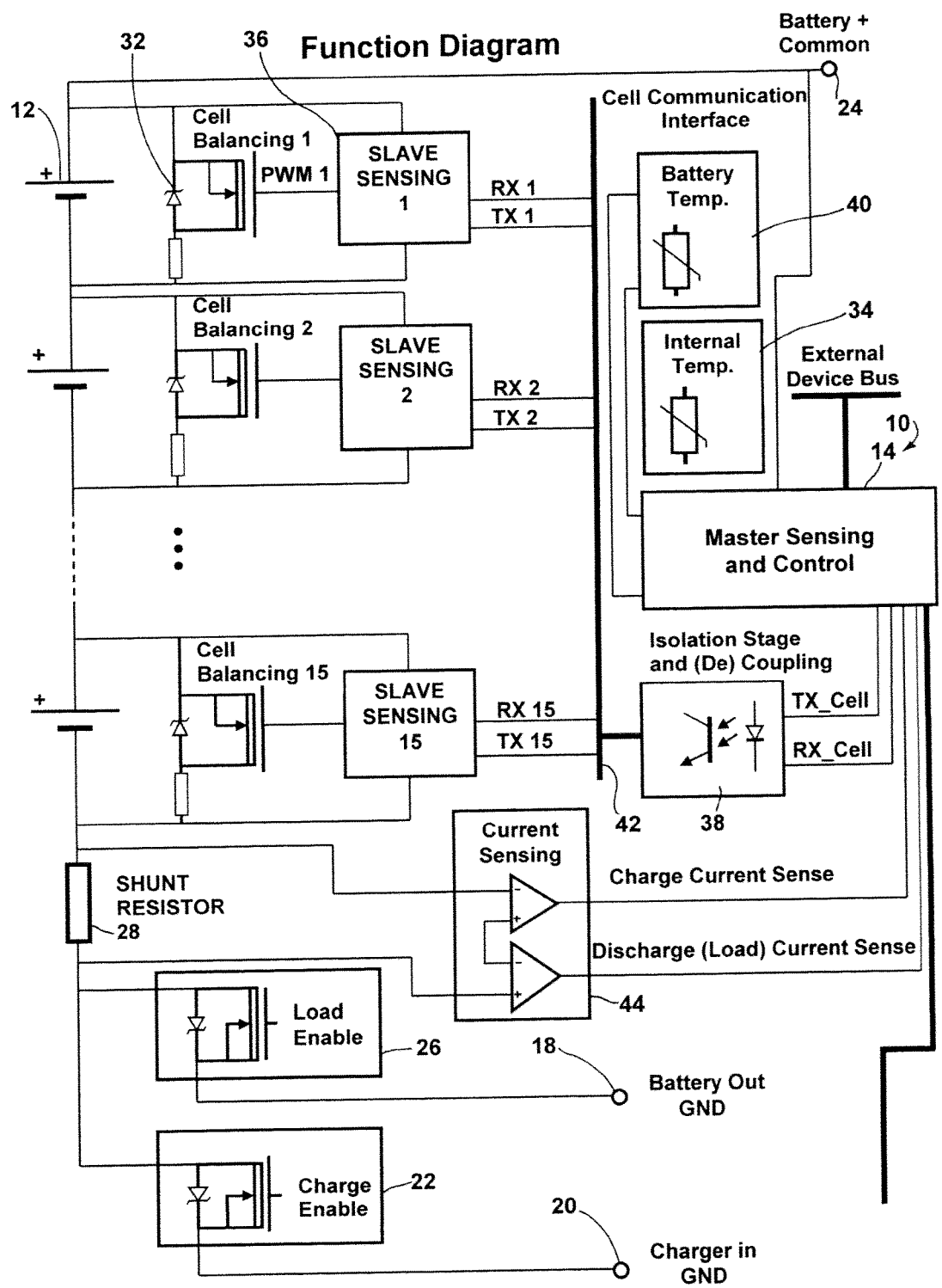
FIG. 4 shows a schematic block diagram of a second embodiment of a BMS (Battery Management System) according to the present invention.

Referring to FIG. 4 there is shown a schematic block diagram of a second embodiment of the battery management system or BMS according to the invention, which is shown connected to a plurality of lithium ion cells, in the embodiment shown in FIG. 4 a total of 15 lithium ion cells. One of the lithium ion cells is designated the reference numeral 12 and the BMS is in its entirety designated the reference numeral 10.

The BMS centrally includes a master microcontroller 14 performing the overall sensing and control of the BMS. The master microcontroller 14 is connectable to external equipment such as an external PC through an external device bus 16.

The BMS is connected to a common battery connector or terminal 24 which is connected to the series configuration of the 15 lithium ion cells 12 and defines a positive terminal. The negative terminal of the series configuration of the 15 lithium ion cells is connected through a low ohm shunt resistor 28. The voltage across the low ohm shunt resistor 28 is sensed by current amplifier 44 delivering an output voltage in response to an excessive current passing through the low ohm shunt resistor 28 during charging or during discharging for informing the central master microcontroller 14 of the occurrence of an excessive current load through the series configuration of the 15 lithium ion cells. In case of a short circuit/overload the threshold of charging currents or discharging currents is reached and the central master microcontroller shuts down the charging/discharging process.

The low ohm shunt resistor 28 is further connected to a junction between the load enable MOSFET 26 and the charge enable MOSFET 22 serving to separate the load discharging out ground terminal 18 and the charging in ground terminal 20. The load enable MOSFET 26 and the charge enable MOSFET 22 are controlled by the central master microcontroller 14 and is used to connect the lithium ion cells to the load in case of discharging and to the charger in case of charging and to shut down the supply of current in case of short circuit/overload as will be described below.

As a particular feature of the BMS according to the present invention each lithium ion cell is connected to a separate monitoring and controlling circuit including for each lithium ion cell a cell balancing circuit 32 and a communication and sensing slave circuit 36 establishing communication from the cell balancing circuit 32 to and from the central master microcontroller 14. The sensing circuit 36 serves to monitor the voltage across the lithium ion cell during charging and in case the lithium ion cell connected to the cell balancing circuit in question has reached the top voltage and the master microcontroller 14 is still controlling the BMS into continuous charging of the remaining lithium ion cells, the cell balancing circuit 32 shunts the lithium ion cell in question which has reached the top voltage for allowing the continuous charging of the remaining lithium ion cells.

The shunting is done by the cell balancing circuit 32 by shorting the positive and the negative pole of the cell through a power resistor and a fast switching transistor. PWM modulation is in an embodiment of the invention done to ensure an adjustable current through the resistor.

The sensing slave circuit 36 serves during discharging of the lithium ion cell to monitor the discharging of the lithium ion cell to a minimum at which time the sensing slave circuit 36 informs the master microcontroller 14 of the occurrence of a complete discharging of one of the cells causing the master microcontroller 14 to shut down the whole circuitry in order to prevent the lithium ion cell having reached the minimum voltage level to be ruined by continuous discharging of the lithium ion cell.

A power supply fed from the battery is used to supply the electronics of the BMS with DC voltage. Switching transistors connected in half bridge configuration and filtered by a low pass filter and further regulated by voltage regulators provide the necessary voltages for the controlling electronics.

An internal temperature sensor 34 serves to monitor and report to the master microcontroller 14 the temperature in the master microcontroller 14 and in case an excessive temperature is reached the master microcontroller 14 the charging/discharging will shut down. A battery temperature sensor 40 serves to monitor and report to the master microcontroller the temperature in the lithium ion cell and/or in the cell balancing and sensing slave circuits 32 and 36, respectively. If an excessive temperature is reached in the lithium ion cell and/or in the cell balancing and sensing slave circuits 32 and 36 the master microcontroller will shut down the charging/discharging process.

A cell communication bus 42 is used for the communication between the master microcontroller and a slave microcontroller provided in each individual slave circuit. The bus is separated from the master microcontroller by an isolation stage and (de)coupling 38. The bus is also used for the fuel gauge where the remaining capacity of the battery is reported.

Figure 5A:
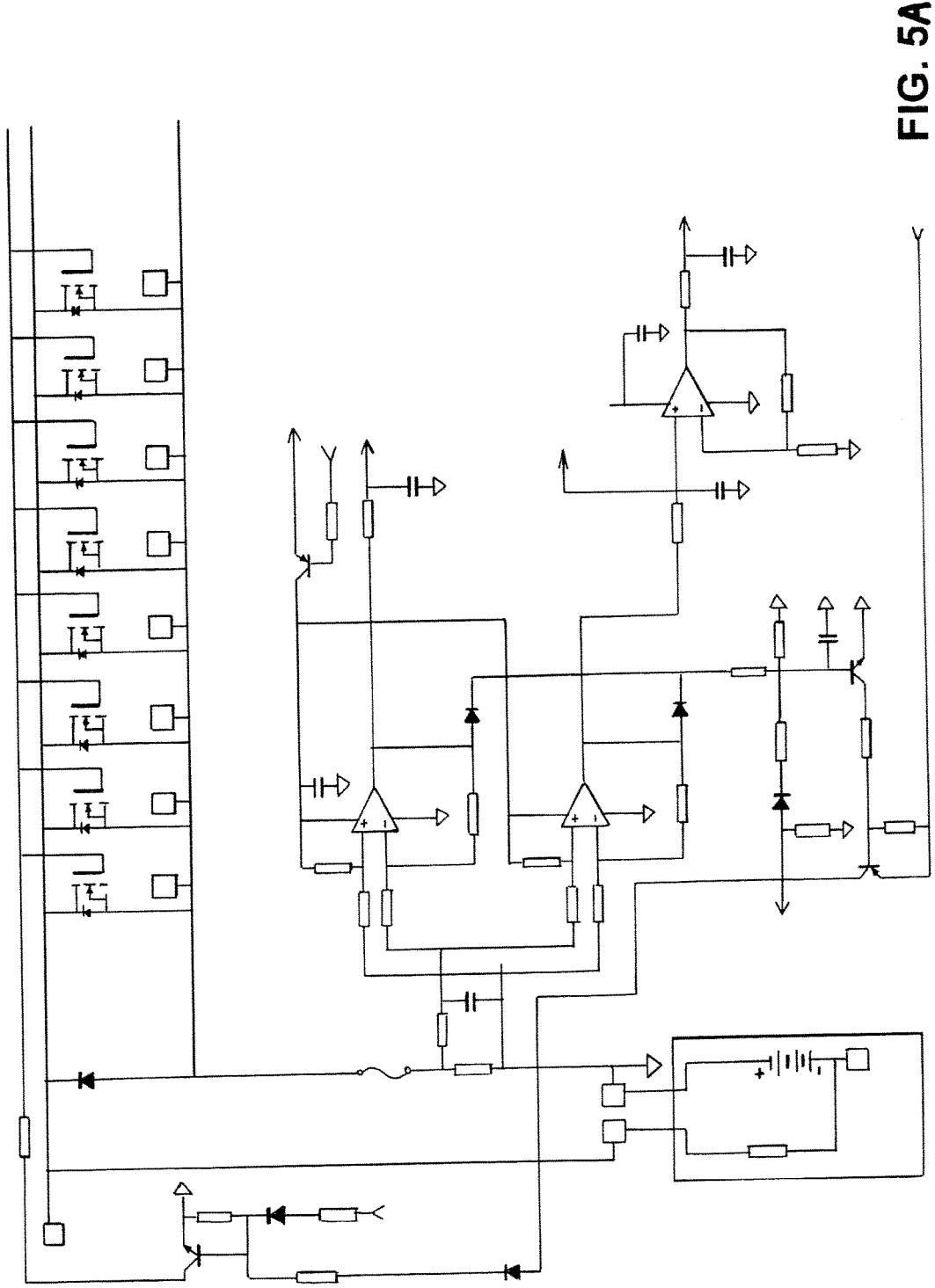
FIGS. 5A and 5B show a schematic view of a battery switch from the second embodiment of a BMS (Battery Management System) according to the present invention.
Figure 5B:
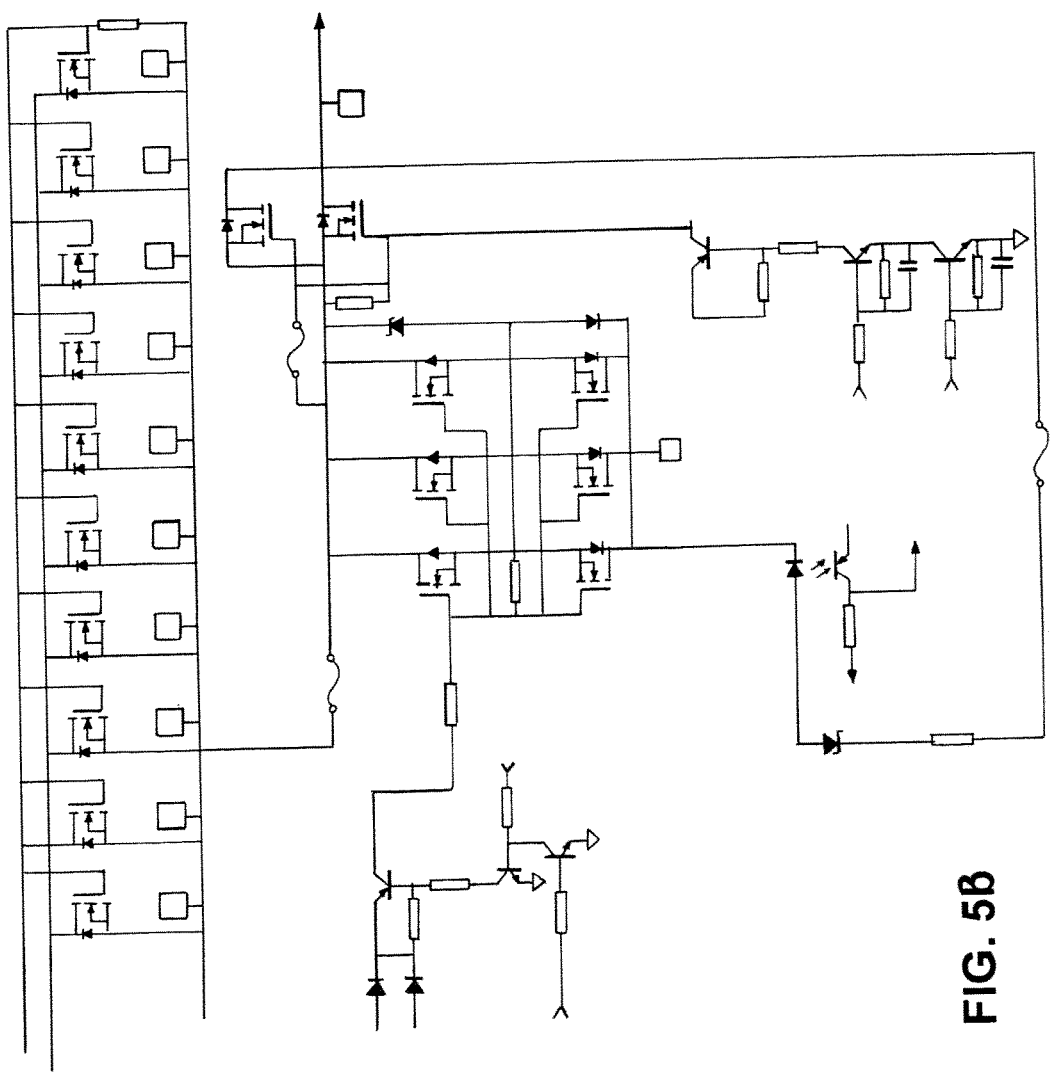

Referring to FIGS. 5A and 5B there is shown a detailed schematic description of a discharge enable and charge enable switch and the current sensing shunt resistor. The BMS contains two parallel CMOS switches which serve to separate the charging input ground connector from the battery output ground connector. Each switch is created by a parallel connection of MOSFETs where MOSFET number D1 up to D20 are used for connecting the load during discharging and MOSFET number D52, D55, D68, D64, D65, D67 are used for connecting the charger during charging.

The load is switched to the battery with 'HIGH' level of BATTERY_SW signal, thereby connecting the positive voltage derived from +15V through Q2 and Q1 transistors. The charger is switched to the battery with 'HIGH' level of CHARGER_SW signal, thereby connecting the +15V through Q29 and Q28 transistors.

The hardware shutdown is activated by reaching the threshold level derived from the shunt resistor in the case of overload/short circuit. The analogue value of the charge current is derived from the U2B inverter output CHARGE. The analogue value of the load current is done in two ranges where the lower current range is read out from output of U4A and the higher range is read out from the output of U2A opamp where the margins of the lower and higher current interval will vary depending on the application and will be set up by gain determining resistors of non-inverting amplifiers R8, R7, R35. The Q30 transistor enables or disables the supply for charge current sensing opamp for power saving reasons.

In case the melting fuse F2 blows due to short circuit through D61 and D71 MOSFETs to prevent the deep discharging of the battery the "Fuse blow" shutdown is initiated by 2 signals in logical AND function provided by Q16 and Q17 to avoid random triggering of "Fuse blown" shutdown. In case of hardware shut down due to a high current level a 'HIGH' level of the SHUT DOWN signal on the Q4 transistor will result in opening of the Q4 transistor which remains open by positive voltage feedback through R24 resistor. The shutdown can be terminated only by changing the level of the SHUTDOWN_RST signal thereby cutting of the Q5 transistor and disconnecting the positive voltage feedback provided by the R24 resistor.

Figure 6:
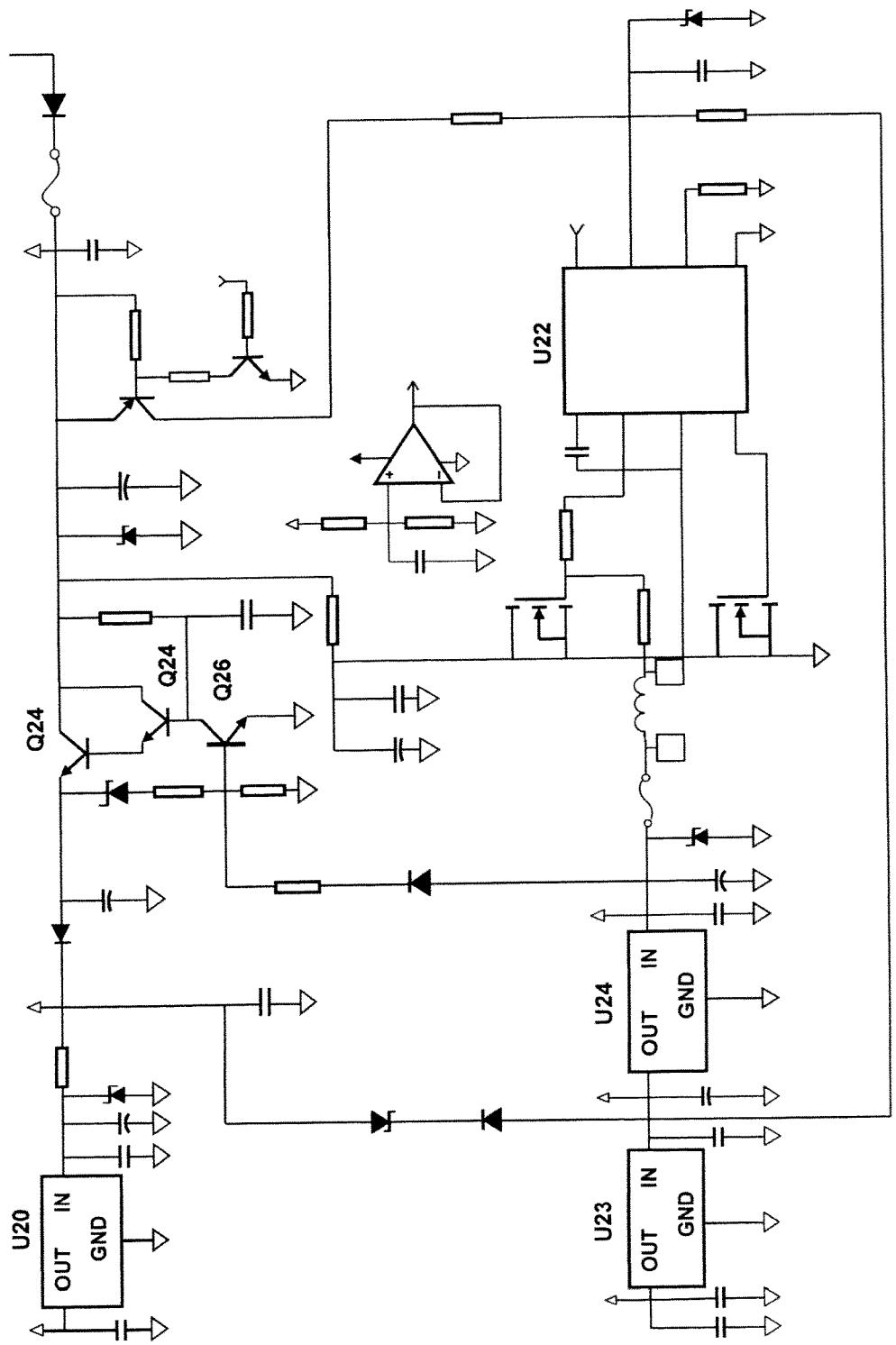
FIG. 6 shows a schematic view of a power supply from the second embodiment of a BMS (Battery Management System) according to the present invention.

Referring to FIG. 6 there is shown a detailed schematic description of a power supply for the control module which is created by D41 and D40 switching transistors connected in halfbridge configuration and driven by U22 halfbridge driver where feedback from the battery voltage is applied through U4B opamp connected in voltage follower configuration in the function as a buffer. The DC output from the control module is created by filtering the pulsing DC voltage from the switching transistors with LC filter L1 and C64 and regulate the voltage by voltage regulators U24 (15V output+ 15V_ON) and U23 (5V output+5V_ON) and +9V by using D48 Zener diode and +5V by U20 regulator where the 5V output is supplied directly from the battery for supplying the main microcontroller in the sleep mode. The +5V output is disabled by Q25 which opens when the PWM (Pulse-Width Modulation) of the halfbridge is active.

Figure 7:
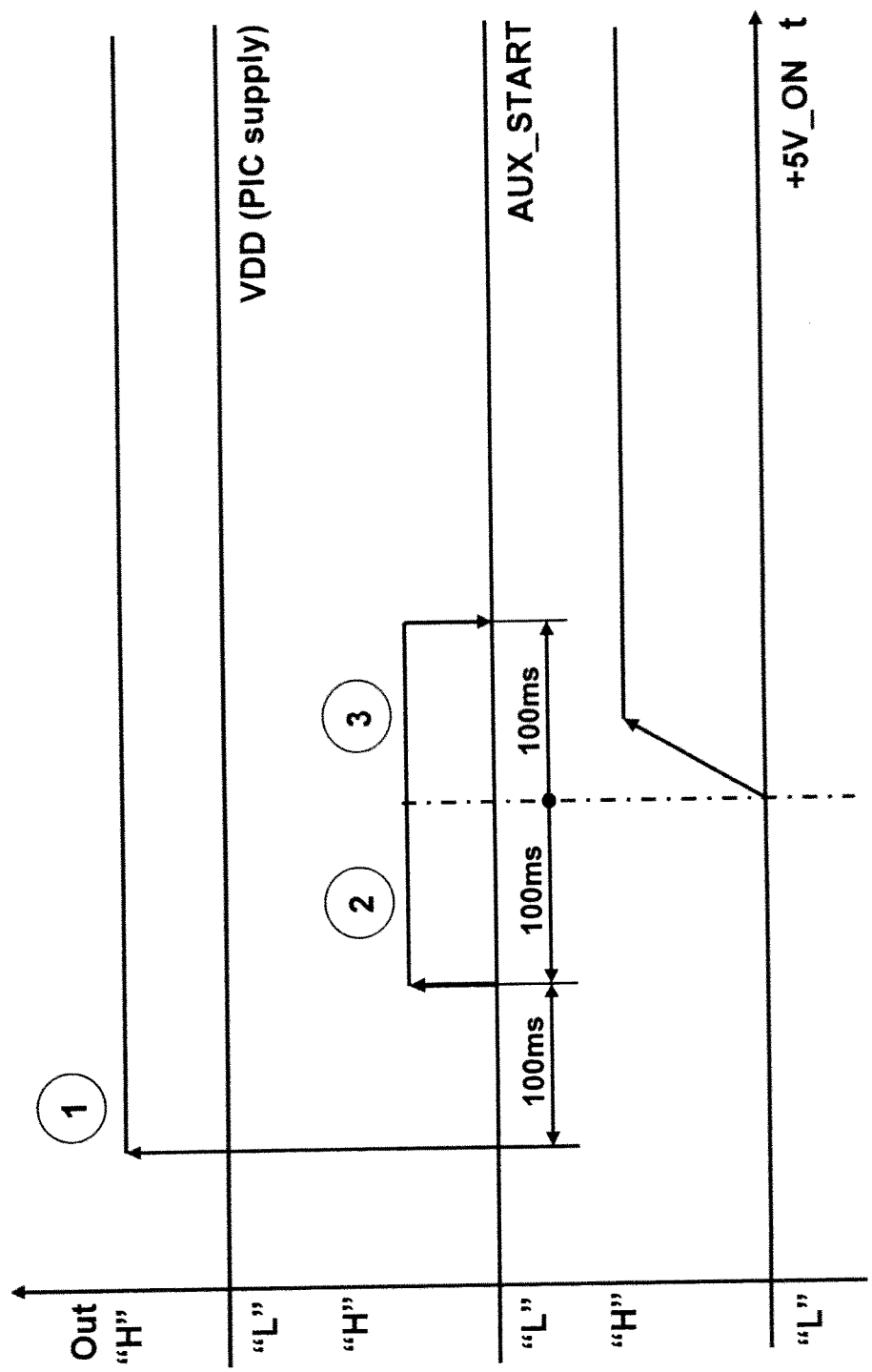
FIG. 7 shows a schematic diagram of a start-up of the power supply from FIG. 6 of the second embodiment of a BMS (Battery Management System) according to the present invention.

Referring to FIG. 7 there is a diagram view of the start-up sequence of the power supply where AUX_START signal 'HIGH' after power-up of the master microcontroller (1) provides temporary power supply for the halfbridge. After approx. 100 ms the DC voltage is fully developed resulting in ramp up of the +5V_ON voltage (2) and after additionally 100 ms the temporary power supply is terminated (3).

Referring to FIG. 8A there is shown a detailed schematic description of a supply part for the communication from the master microcontroller to the slave microcontroller communication bus where signal from the master microcontroller to the slave microcontroller TX_CELL is amplified by Q10 transistor.

Referring to FIG. 8B there is shown a detailed schematic description of a supply part for the communication from the slave microcontroller communication bus to the master microcontroller where the signal from the slave microcontroller to the master microcontroller is supplied by a +5V_ON signal and the current is limited by R194 resistor when RX_CELL is switched to ground to provide the "LOW" signal level.

Referring to FIG. 8C there is shown a detailed schematic description of an internal temperature sensor where the internal temperature is sensed by R45 thermistor.

Referring to FIG. 8D there is shown a detailed schematic description of an external temperature sensor where the external or battery temperature sensing is provided by transient voltage suppressor diodes, voltage level adjusting resistors, filtering capacitors and external NTC thermistor.

Referring to FIG. 8E there is shown a detailed schematic description of an analogue output for a fuel gauge where the voltage level is adjusted by a R44 resistor. The fuel gauge use the PWM output (V_OUT) where the duty cycle of the output can be used for deriving the remaining capacity of the battery alternatively the PWM output (V_OUT) can be used to carry binary information for a digital fuel gauge. The fuel gauge is counting all currents going in an out of the battery. A two stage amplifier Q11, Q13, Q12, Q14 is used to improve current carrying capability of the PWM_output. The stages in the two stage amplifier are filtered by parallel RC network and separated by a ISO1 optocoupler from the master microcontroller.

Figure 9:
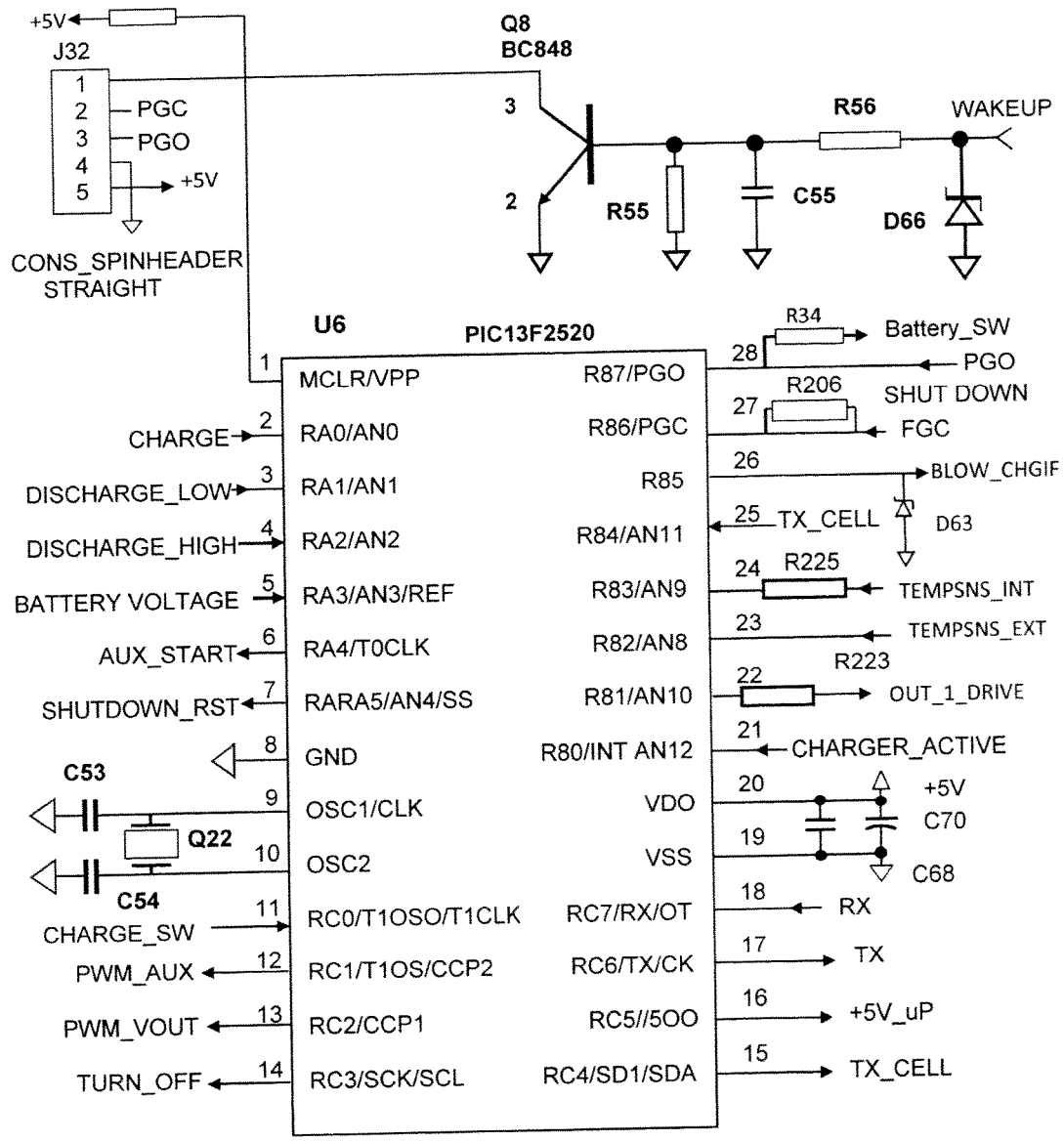
FIG. 9 shows a schematic view of a synchronizing and control unit from the second embodiment of a BMS (Battery Management System) according to the present invention.

Referring to FIG. 9 there is shown a synchronizing and control unit for the slave microcontroller for controlling shut down, enabling charging or discharging and sensing circuit. Each slave have their own address for the master to recognize them and each slave individually receives synchronise pulse and values for cell balancing from the master and sends voltage measurements and status information to the master. The sensing circuit consists of current sensing of the discharge current (DISCHARGE_HIGH, DISCHARGE_LOW), sensing of the charging current (CHARGE), sensing of the internal temperature (TEMPSNS_INT), sensing of the external temperature (TEMPSNS_EXT) and sensing of the battery voltage (BATTERY_VOLTAGE). The power supply of the control module is supported at the startup by a START_AUX signal and the switching of the halfbridge is regulated by a PWM_AUX signal and the feedback from the output +5V_ON when the halfbridge is ready to supply its driver from its own output. The 5V_uP can disable the current sensing opamps thereby reducing the power consumption in the sleep mode. The CMOS switch for enabling charging is controlled by CHARGE_SW signal and the CMOS switch for enabling discharging is controlled by BATTERY_SW signal. The 'HIGH' SHUT_DOWN signal will disconnect the +15V from the gates thereby securing open status of the MOSFETs and the almost immediately following 'HIGH' level of the TURN_OFF signal secures the fast discharging of the gates through 12 ohm resistor. The microcontroller provide a shut down status cancelling by a SHUT_DOWN signal at 'LOW' level for at short period of time and the driving signals for OUT_1 and OUT_2: OUT_1_DRIVE and OUT_2_DRIVE. The 'HIGH' level of WAKE_UP signal provides a low signal on the pin 1 of the Microcontroller through grounding the collector of Q8 thereby activating the microcontroller from power save (standby) mode. The cell communication is provided by TX_CELL (transfer to cell) signal and RX_CELL (receiving from cell) signal thereby the charge can be regulated by the BMS by transferring information to the cell by using TX_CELL and receiving information from the cell by using the RX_CELL signal and further diagnostics of the BMS can be made using the appropriate software.

Figure 10A:
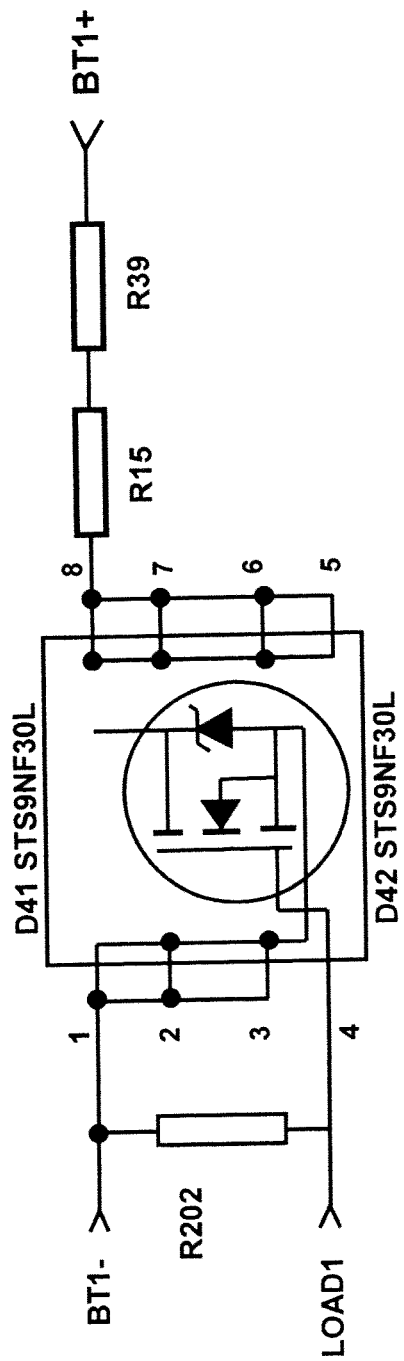
FIGS. 10A and 10B show, respectively, schematic views of a cell balancing module and a cell voltage measurement module from the second embodiment of a BMS (Battery Management System) according to the present invention.

Referring to FIG. 10A there is shown a cell balancing module where the charging of each individual cell is controlled by its own voltage spike protected microcontroller. Cell balancing is provided by shorting the positive and negative pole of the cell through a power resistor and a fast switching transistor. PWM is used to ensure adjustable current through the resistor. The slave receives a voltage from the master, calculated the difference between the received value and computes the duty cycle for the cell balancing PWM. If the cell voltage is lower than the received voltage from the master the PWM is set to zero.

Figure 10B:
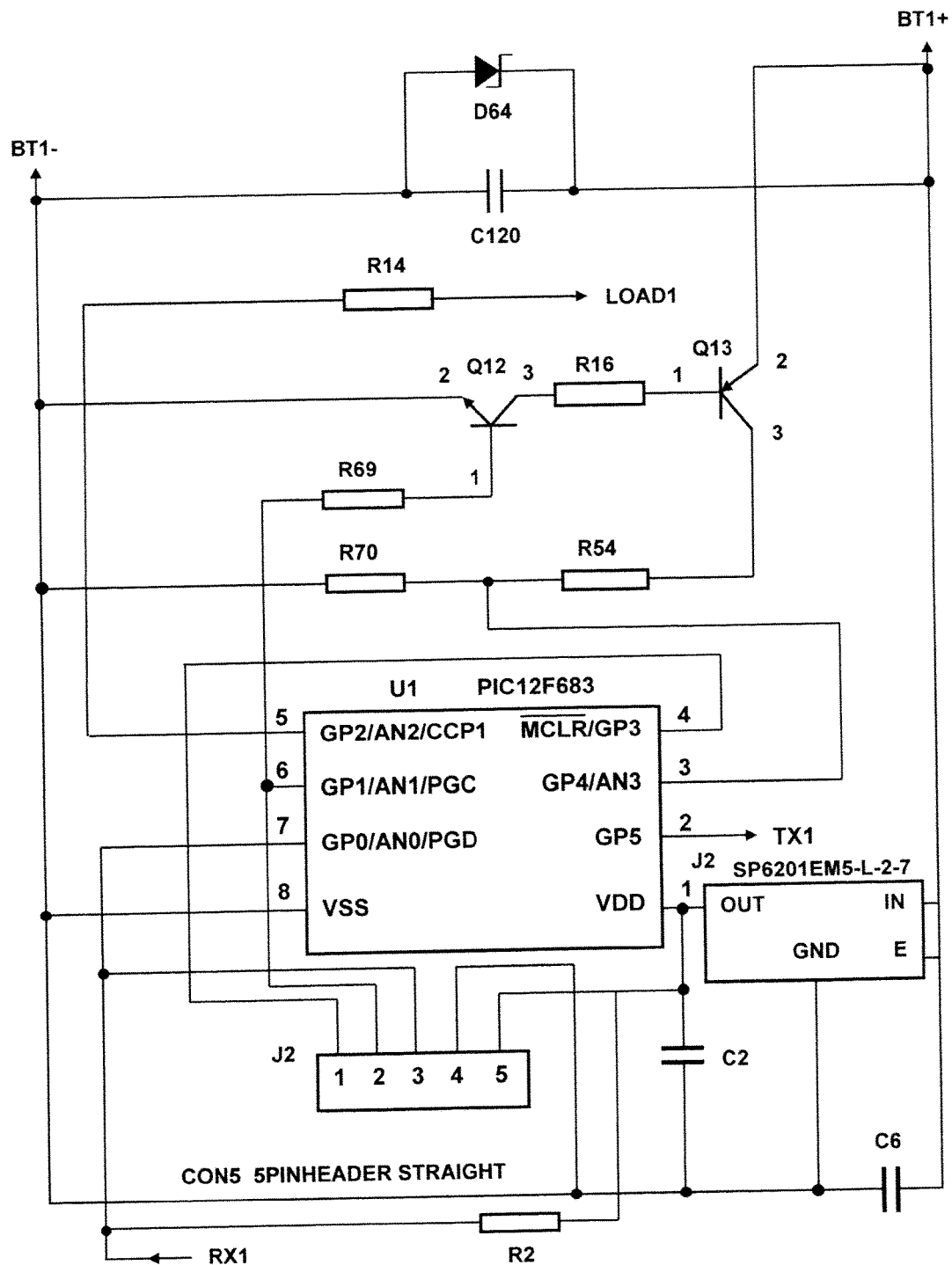

Referring to FIG. 10B there is shown a cell voltage measurement module where measurement is done by a voltage divider made of parallel 1 k ohm resistors where the analogue value is connected to pin 3 of the microcontroller. The cell balancing is stopped while measuring voltage to avoid a voltage drop in cables. The measurement is transmitted to the master microcontroller. In the sleep mode the voltage sensing is disabled by turning off the NPN transistor resulting in the PNP transistor being cut off as well.

Referring to FIG. 11A there is shown a single wire bus for communicating the TX and RX signals to a single wire DATA including galvanic isolation from the source and amplifying by D64 transistor.

Referring to FIG. 11B there is shown a power stage of the output OUTPUT_1

Referring to FIG. 11C there is shown a protection circuitry of the thermistor monitoring the battery and/or in the cell balancing and sensing and control circuits.

Figure 12:
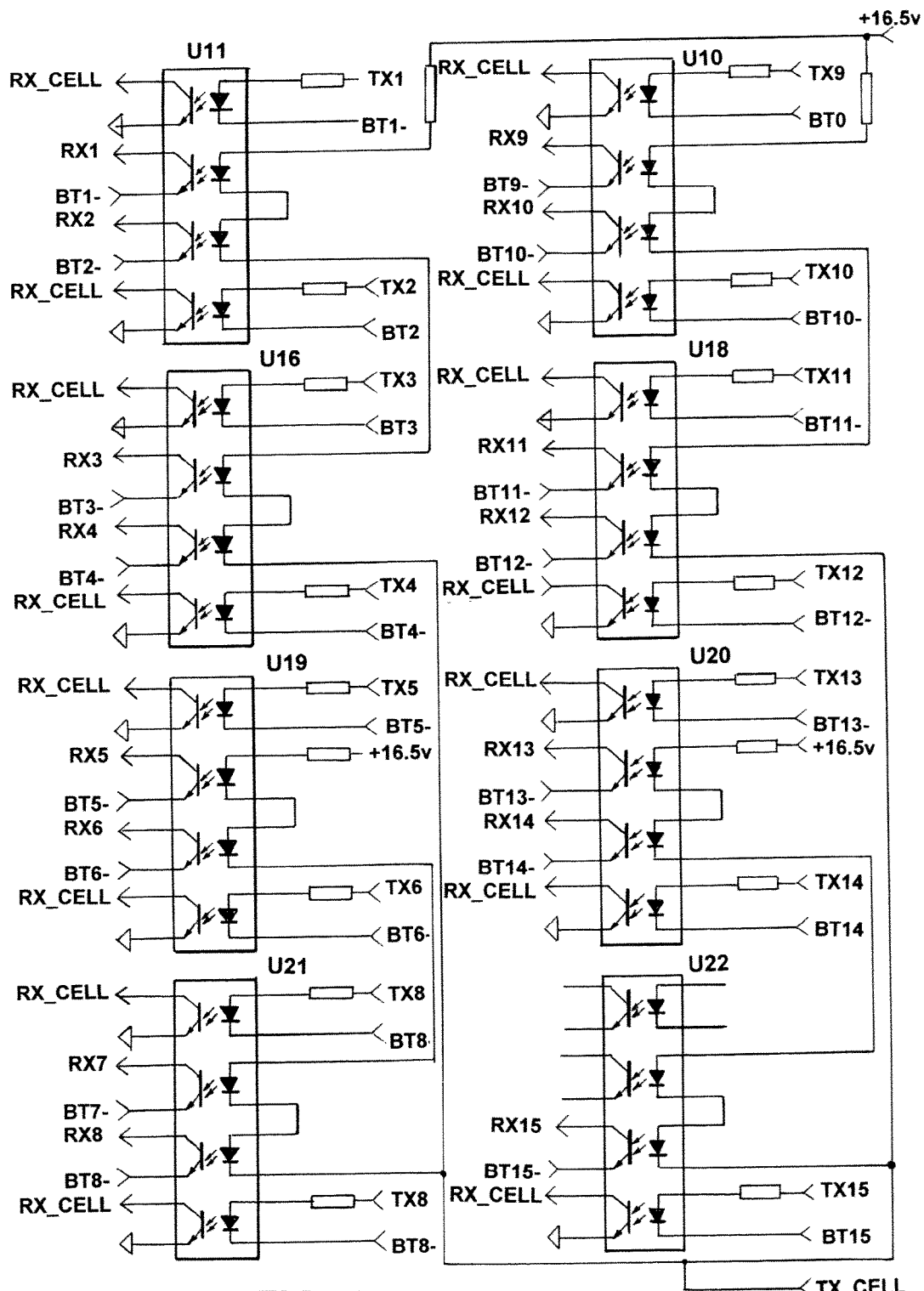
FIG. 12 shows a schematic view of a cell to master the microcontroller communication bus.
Figure 13:
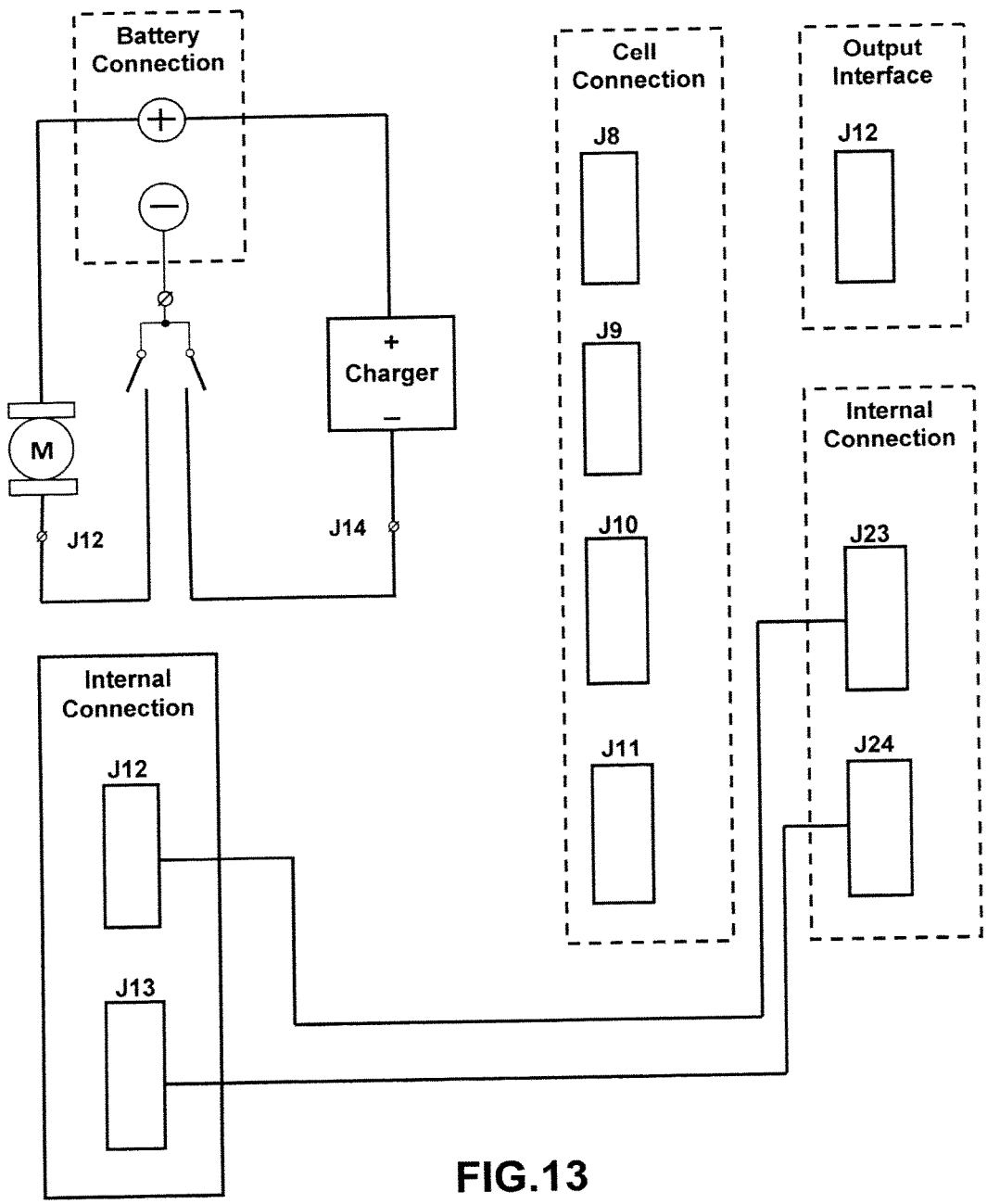
FIG. 13 shows a schematic view of a battery management system main connectors layout.

Referring to FIG. 12 there is shown a cell to master microcontroller communication bus for decoupling the TX_CELL signal to RX1 up to RX15 signals and coupling of the TX1 up to TX15 to RX_CELL signal.

A detailed description of an embodiment of the invention is given with reference to the following annexes, where:

ANNEX A contains a technical description;

ANNEX B contains a software description; and

ANNEX C contains detailed circuit diagrams of portions of the system.

Annex A

System Specification

| | | |
|---|---|---|
| Battery Voltage | Amount of cells | 15 |
| | Cell voltage | 2.8 V-4.2 V/cell |
| | Minimum voltage | 42 VDC |
| | Maximum voltage | 63 VDC |
| DC Current Handling | Continuous discharge current | 150 A |
| | Peak discharge current (<8 s) | 250 A |
| | Max. charge current handling | 35 A |
| | Peak charge current (<1 s) | 50 A |
| Measurements/ Accuracy | Single cell voltage | <1% |
| | Battery voltage | <1% |
| | Δ temperature resolution | <0.25° C. |
| | Temperature | +/−3° C. |
| Cell Balancing | Maximum bypass current 1 A | Adjustable from 0 A |
| BMS Power Consumption | Standby consumption | <250 µA |
| | Active consumption | <50 mA |
| Overload | Discharge >200 A | Software shutdown |
| | Resting period | 10 s, 3 attempts in a row to restart BMS |
| | Custom overload behavior | TBD |
| Short Circuit | Battery short circuit activation | Hardware shutdown |
| | Resting period | 10 s, 3 attempts in a row to restart BMS |
| | Custom Short circuit behavior | TBD |
| Fuse | MEGA FUSE from Littel fuse | 175 A |
| High Temperature Protection | Heat sink | Passive |
| | Termination due overload | |
| Over-voltage | Battery disconnection response time when overvoltage appears | 20 ms |
| | Single cell disconnection in the case of overvoltage | 1 s |
| Under-voltage | Device shut down | TBD |
| Operating Conditions | Minimum ambient temperature | −20° C. |
| | Maximum ambient temperature | +50° C. |
| | Maximum operating temperature | +105° C. |

Mainboard Description

The BMS module can be in principle described as a high current capacity CMOS switch featured by emergency shut down in the case of short-circuit or overload of the battery. This switch provides connection of the charger to the battery in the case of charging and to the load (motor) during normal operation.

Battery switch for charger and load controlled by microcontroller featured by hardware shut down in the case of overload or short circuit; current sensing Power supply for the control module Supply part for the cell communication bus and analogue output reserved for fuel gauge Master microcontroller Function:

Battery switch for charger and load controlled by microcontroller featured by hardware shut down in the case of overload or short circuit; current sensing. Additionally "fuse blow" shutdown is introduced to prevent the deep discharging of the battery in the case of short circuit of switching MOSFETS.

Description:

The BMS contains two parallel CMOS for connecting the battery to the charger or to the load. Each switch is created by a parallel connection of MOSFETs: Transistors D1 up to D20 for the load connection and the switch for charger connection is created by a parallel combination of D52, D55, D68, D64, D65, D67 transistors.

In the normal mode the load is switch to battery with 'HIGH' level of BATTERY_SW signal. This connects the positive voltage derived from +15V through Q2 and Q1 transistors. The connection of the charger is enabled by Q29 through Q28 transistors with 'HIGH' CHARGER_SW signal.

The hardware shutdown is activated by reaching the threshold level of currents in the case of overload/short circuit. The current level is derived from the shunt resistor R1, the analogue value of the charge current is derived from the U2B inverter output—CHARGE. The readout of the load current is done in two ranges: for the lower current range is read out from output of U4A and the higher range from the output of U2A opamp. The margins of lower and higher current interval will be various depending on the concrete project and will be set up by a gain determining resistors of a non-inverting amplifiers R8, R7, R35. The Q30 transistor enables or disables the supply for charge current sensing opamp for power saving reasons.

The hardware shut down initiated by a high current level will result the 'HIGH' level of the SHUT_DOWN signal on the Q4 transistor resulting the opening the Q4 transistor, which remains open through positive voltage feedback through R24 resistor (note that the level of the SHUT-DOWN_RST signal is 'HIGH' during normal operation.

Positive voltage of SHUT DOWN opening Q6 closes Q2 resulting the cut off of the Q1 transistor which disconnects the +15V source before connecting the gates of the switches to ground to prevent the short circuit of +15V_ON to the ground which could appear when gates of transistors are grounded.

The shutdown can be terminated only by changing the level of the SHUTDOWN_RST signal cutting off the Q5 transistor and disconnecting the positive voltage feedback provided by R24 resistor.

The shut down initiated by a microcontroller is done by setting the level of TURN_OFF to 'HIGH' level (software shutdown).

The "fuse blow" shutdown is providing by connecting the positive and negative poles of the battery resulting short-circuit through D61 and D71 MOSFETs. The short circuit current will blow the charger fuse F2. The "fuse blow" shutdown is initiated by 2 signals in logical AND function (provided by Q16 and Q17 circuitry) to avoid random triggering of this type of shutdown. The activating of the charger is indicated to processor by "HIGH" CHARGER_ACTIVE signal.

See FIG. 6

Function:

Power supply of the control module

Description:

The core of the power supply fed from battery and created by a D41 and D40 switching transistors connected in half-bridge configuration driven by a U22 halfbrigde driver. Feedback from the supply (battery) voltage is applied through U4B opamp connected in voltage follower configuration in the function as a buffer.

The DC output is created by filtering the pulsing DC voltage with lowpass LC filter (parallel connection of L1 and C64). The regulated voltages are provided by voltage regulators U24 (15V output +15V_ON) and U23 (5V output +5V_ON); +9V by using D48 Zener diode and +5V by U20 regulator. The +5V output is supplied directly from the battery and it is meant only for supplying the main microcontroller in the sleep mode. The +5 V output is disabled by Q25 transistor, which opens when the PWM of the halfbridge is active, Firstly the AUX_START signal I 'HIGH' at the startup to ensure the supply VCC voltage for the drive. After some time this signal is set to 'LOW' and the VCC is derived from the +15V_ON voltage. The startup of the switching power supply of the control module can be described as shown on FIG. 1. After power up of the master microcontroller (1.) the processor set up the AUX_START signal to "HIGH" to provide the temporary supply for the halfbridge driver. After a certain time (approx. 100 ms) the DC voltage is fully developed resulting the ramp up the +5V_ON voltage (2.). To ensure the correct function of the power supply, the temporary supply is hold on for additionally 100 ms and after this it is terminated (3.).

See FIG. 7

See FIGS. 8A, 8B, 8C, 8D, and 8E

Function:

Supply part for the cell communication bus and analogue output reserved for fuel gauge Description:

The transfer signal from the microcontroller to cells TX_CELL is amplified by a Q10 transistor. The signal received from the slave microcontrollers by a master controller is supplied by a +5V_ON signal and the current is limited by a R194 when the RX_CELL is switched to ground to provide the "LOW" signal level. The internal temperature is sensed by a R45 thermistor and the voltage level for the controller is adjusted by a R44 resistor.

For the fuel gauge is reserved the PWM output (V_OUT), where the duty cycle of the output (i.e. the pulse width) can be equal to the remaining capacity of the battery or it is also capable to carry binary information for digital fuel gauge. The current carrying capacity of the output is improved by a two stage amplifier created by Q11, Q13 and Q12, Q14. The stages in cascade connections are filtered by a lowpass filters created by a parallel RC networks. This output is also separated by a ISO1 optocoupler from the master microcontroller.

The circuitry for the external temperature sensing is created by a transient voltage suppressor diodes, voltage level adjusting resistors, filtering capacitors and the external NTC thermistor.

See FIG. 9

Function:

Synchronizing and the control of the slave microcontrollers. Controlling of the shut down and enabling of the load and the charger.

Description:

Microcontroller can be programmed and reconfigured by a J32 connector. The signals for synchronizing and controlling can be divided to following groups:

Sensing circuits
Control module power supply startup and regulation
CMOS switch control
Cell communication
Charger communication
Analogue/digital output The sensing circuitry consists of current sensing of a load current (DISCHARGE_HIGH and DISCHARGE_LOW) and the charging current (CHARGE), sensing of the internal temperature (TEMPSNS_INT) and the temperature of the battery (TEMPSNS_EXT), sensing of the battery voltage (BATTERY_VOLTAGE).

The power supply of the control module is supported at the startup by a START_AUX signal and the switching of the halfbridge is regulated by a PWM_AUX signal and the feedback from the output +5V_ON to notify when the halfbridge is ready to supply its driver from its own output. The +5V_uP can disable the supplying the current sensing opamps thus reducing the power consumption in the sleep mode.

The CMOS switch of the charger is switched by CHARGE_SW signal and the load switch is controlled by a level of a BATTERY_SW signal. In the case of the shut down the positive voltage SHUT DOWN will disconnect the +15V volts from the gates securing the open status of the MOSFETs and almost immediately after that the 'HIGH' level of the TURN_OFF signal secures the fast discharging of the gates through 12.OMEGA. resistor.

The cell communication is provided by a TX_CELL signal (transfer to cells) and RX_CELL (receiving from the cells).

During the charging the charge can be regulated by BMS transferring information to a charger using TX signal and receiving information from the charger—RX signal. These signals can be used for a diagnostic of the BMS with the proper software.

The microcontroller provide a shut down status cancelling by a SHUT_DOWN signal at 'LOW' level for a short period of time and the driving signals for outputs OUT_1 and OUT_2: OUT 1 DRIVE and OUT 2 DRIVE.

The processor is activated from the power save (standby) mode by "HIGH" level of WAKE UP signal which will provide low signal on the pin 1 of the Microcontroller through grounding the collector of the Q8.

Control Module

The main function of the control module is the supervising the charging of the separate cells of the battery and the overall charging by controlling of the charger.

See FIGS. 10A and 10B

Function:

Cell Balancing

Description:

Each separate cell of the battery is controlled by its own voltage spike protected microcontroller. The cell balancing is provided by shorting the positive and negative pole of the cell through the power resistor. The bypassing is done by a PWM modulation to ensure the adjustable current through the resistor. The cell is bypassed through fast switching transistor. The cell voltage measurement is done by a voltage divider made of parallel 1 k.OMEGA. resistors, where the analogue value is connected to pin 3 of the slave microcontroller.

In the sleep mode the voltage sensing is disabled by turning off the NPN transistor resulting the cut off the PNP transistor as well.

See 11A, 11B, and 11C

Function:

Single wire bus for a charger communication and output interface.

Description:

Converting TX and RX signals to a single wire DATA featured galvanic isolation from the source and amplifying by D64 transistor. The control module also includes power stage of the output OUTPUT_1. On control board there is an additional protection circuitry of the thermistor located on the mainboard.

See FIG. 12

Function:

Cell to microcontroller communication bus signal coupling/decoupling including galvanic isolation.

Description:

Decoupling the TX_CELL to RX1 up to RX15 signals and coupling of the TX1 up to TX15 to RX_CELL signal.

Software Features

Internal Functions:

Analogue Measurements

Measurement of the battery voltage, current sensing, temperature sensing is described in the hardware part—refresh time: 10 msec

Power Management

To minimize the power consumption in the sleep mode some power saving features are involved in the design:

Disconnecting the charger

Disabling the voltage measuring of the separate cells

Disable the continuous current sensing (sample monitoring 10 times per second)

Disabling the power supply for the control circuitry except the master microcontroller

Power Supply

| | |
|---|---|
| Power supply start up voltage.[1] | 27.78 V |
| Power supply output voltage | 20 V |
| Power Supply Max PWM duty cycle | 90% |

[1]Minimum overall voltage required to start up the power supply

Functions:
Charging

| | |
|---|---|
| Charging max current (<1 sec)[2] | 35 A |
| Charging max current (<40 msec)[3] | 50 A |
| Charging shutdown resting time[4] | 10 sec |
| Shutdowns in a row[5] | 3 |
| Cell voltage max[6] | 4.25 V |
| Cell voltage max reset | 4.15 V |
| Total voltage max[7] | 58.8 V |
| Total voltage max reset | 58.1 V |

[2]Duration longer than 1 second is considered for an overload
[3]Duration longer than 40 milliseconds is considered for an overload
[4]Time interval until next restart attempt
[5]Maximum number of attempts in a row until definitive shutdown of BMS
[6]When the highest cell voltage reach this value the charging is stopped and cell balance will equalize the cell voltages. When the maximum cell voltage falls bellow the value given by Cell voltage max reset the charging is re-enabled
[7]When the battery voltage reach this level the charging is stopped and again re-enabled when the voltage falls below Total voltage max reset value

Discharging

| | |
|---|---|
| Discharging max current (<1 sec) (see note 2) | 200 A |
| Discharging max current (<40 msec) (see note 3) | 250 A |
| Discharge shutdown resting time (see note 4) | 10 sec |
| Shutdowns in a row (see note 5) | 3 |
| Cell voltage min[8] | 2.8 V |
| Cell voltage min reset[9] | 3.7 V |
| Discharge re-enable fuel gauge[10] | 10 Ah |

[8]If the lowest cell voltage reach this value the discharge is stopped
[9] The lowest voltage amongst cell voltages must reach this value to re-enable discharging
[10]The minimum charged remaining capacity of the battery, when the discharge is re-enabled

Cell Balancing

When cell balancing is started, the PWM is computed from the cell voltage. The computing is done by adding the differences in cell voltage from the lowest cell voltage, together. After adding all cell voltages, the PWM value to each cell is computed to ensure total maximum power dispassion don't exceed the limit

| | |
|---|---|
| Cell balance max power[11] | 27 W |
| Cell balance start voltage average[12] | 4.10 V |
| Cell balance peak start voltage[13] | 4.20 V |
| Cell balance min charge current[14] | 0.5 A |

[11]Maximum overall power dissipation allowed on the cell balancing power resistors
[12]When the average voltage from all the cells reaches this level and the Cell balance min charge current condition is fulfilled the cell balancing is triggered
[13]When the voltage of any of the cells reaches this value the cell balancing is triggered
[14]When the charging current reaches this value and the Cell balance start voltage average condition is fulfilled the cell balancing is triggered

Temperature

| | |
|---|---|
| Battery Temperature cut off high[15] | 70° C. |
| Battery Temperature high reset | 60° C. |
| Battery Temperature cut off low[16] | −20° C. |
| Battery Temperature low reset | −10° C. |
| BMS Temperature cut off high[17] | 100° C. |
| BMS Temperature high reset | 90° C. |

[15]When this battery temperature is reached the charging and the discharging is stopped until the temperature fall to Battery Temperature high reset and then the functions are re-enabled
[16]When this battery temperature is reached the charging and the discharging is stopped until the temperature rise to Battery Temperature low reset and then the functions are re-enabled
[17]When this internal BMS temperature is reached the charging and the discharging is stopped until the temperature does not fall to BMS Temperature high reset and then the functions are re-enabled.

Fuel Gauge (Counting Amp/hours)

| | |
|---|---|
| Fuel Gauge min input[18] | ±0.3 A |
| Max value[19] | 105% of the specified capacity |
| Self learning[20] | 1%/cycles |

[18]The value of the charge/discharge current must exceed this value to be relevant for the gauge counting
[19]Maximum value indicated by a fuel gauge related to previously evaluated capacity using self learning
[20]When the battery is charged from empty to full the real capacity can be reevaluated in the range of 1% from the previously obtained value in the self learning process

Sleep Mode

| | |
|---|---|
| Enter sleep mode after (<300 mA) | 60 sec |
| Wakeup current | 300 mA |
| Standby search time | 0.1 sec |

Interfaces:

Single wire bus (communication with a charger or the diagnostic program)

1 Analogue output

1 Open collector "High"/"Low" level output

BMS Internal (Cell) Communication

Internal Communication

The master controls and monitors all the slaves by a communication between slaves and master. The master handles the communication and the slaves only respond when asked. The communication is build upon a QSART full duplex, running on 5 kb with 9 bit transmission. When the 9th bit is set, the byte is a command, otherwise its data.

When receiving a package, it is stored in a buffer to calculate if the checksum is the same as received. Only lithe checksum matches it will use the package.

Start Byte/Address

In the beginning of all packages, there has to be a start byte containing the address of the slave witch is receiving or transmitting. It is possible to connect up to 120 slaves to the master. The slaves will have there on address given in production for the master to access them. The addresses of the slaves will start from 1 and up to the number of slaves connected.

List of Addresses: (9th Bit Set)

| Value | Address |
|---|---|
| 0 | Global address |
| 1-120 | Slave address |

Command

The master sends packages to the slaves to give inform or give instructions. The command is always the first byte after the start byte.

There are always 3 command bytes in one package (Start byte, Command and Checksum)

List of Commands: (9th Bit Set)

| Value | Name | Description |
| --- | --- | --- |
| 0-120 | Start byte | Start byte and address of the slaves |
| 121 | Send info to master | Return data to master |
| 122 | Info from master | Average battery voltage |
| 123 | Error check | Check if one of the slaves has a error |
| 124 | Enter sleep-mode | Put the slaves into sleep-mode |
| 125 | Sync pulse | The master will transmit a sync pulse |
| 126 | Calibration | The Master transmit the real cell voltage and the slaves adjust the measured voltage |
| 128-255 | Checksum | |

Data

In some of the Packages it is necessary to transfer a few data bytes. When transmitting a data byte, the parity bit has to be low to indicate, it is a data byte and not a command. The receive buffer in the slaves is very small and it is only packages is possible to transmit or receive packages up to 16 bytes of data. When transmitting data values of 2 bytes, LSB is sent first.

Checksum

The checksum is the last byte of the packages and data coming after what is ignored only a new start byte in a new package is accepted. Since the check sum only calculate with 8 bits a value 25 is added for each parity bit. Every time the checksum has overflow the checksum is incremented one time. The checksum it self is not added to the checksum and not taken into calculation. The checksum can only have the value from 128 to 255, if the value is out of range two different values is added depending of the checksum value.

| Checksum | Value to Add |
| --- | --- |
| Parity | 25 |
| Each byte | 1 |
| Overflow | 1 |
| 0-122 | 133 (128 + 5) |
| 123-127 | 10 |
| 128-255 | No add |

| Ex 1: | Ex 2: | Ex 3: |
| --- | --- | --- |
| Start byte: 15 | Start byte: 120 | Start byte: 15 |
| Command: 121 | Command: 121 | Command: 122 |
| Data: No | Data: No | Data: 189 |
| Data: No | Data: No | Data: 3 |
| Checksum: 186 | Checksum: 169 | Checksum: 134 |

Standard Master Package:

| Byte count | Name |
| --- | --- |
| 1 | Start byte/Address |
| 1 | Command |
| 2 | Data (Cell Balance Voltage) |
| 2 | Data (PWM Steps/Voltage) |
| 1 | Checksum |
| 7 | Total bytes |

Standard Slave Package:

| Byte count | Name |
| --- | --- |
| 1 | Start byte/Address |
| 1 | Data (Status byte) |
| 1 | Data (PWM value) |
| 2 | Data (Battery Voltage) |
| 1 | Checksum |
| 6 | Total Bytes |

Annex B

1 Master version 1.03.05

The master is controlling the BMS charger and discharge current and gatherings information from the slaves for cell balancing and protection.

1.1 Measurements

The master measures charge current, discharge current, battery voltage, internal temperature and battery temperature. All measurements are computed 100 times/sec and average measurements are made each second.

1.2 Internal Communication

The master controls the communication between master and all slaves. The following flow chart is repeated all the time in normal operation.

1. The master is sending a synchronisation pulse for the slaves to adjust there clock frequency for drifting over temperature.
2. Information about cell balancing is send from the master to all slaves.
3. The master gathers voltage information from all the slaves.

1.3 Single Wire

Information about the status of the BMS and measured voltages of the slave is transmitted each second in normal operation.

Information from Master

| Bytes | Name | Description |
| --- | --- | --- |
| 4 | Status bytes | Bit information |
| 1 | Cell count | Number of cells in the BMS |
| 2 | Battery voltage | Measured battery voltage in the BMS |
| 2 | Total battery voltage | Slave voltages added together |
| 2 | Cell voltage low | The lowest cell voltage |
| 2 | Cell voltage average | The average cell voltage |
| 2 | Cell voltage high | The highest cell voltage |
| 2 | Fuel gauge | Fuel gauge counter |
| 2 | Discharge current | Discharge current |
| 2 | Charge current | Charge current |
| 2 | Temperature in | Temperature inside BMS |
| 2 | Temperature out | Battery temperature |
| 2 | Cell voltage steps | Total amount of cell balancing |
| 2 | Cell voltage pwm | Cell balance voltage for pwm |

1.4 Power Supply

In normal operation the 5 volt and the 16 volt is power supply running and stopped in sleep.

Flow chart when starting up the power supply:
1. Power up the 5 volt power supply and wait 80 msec
2. Measure offset on Op amps.
3. Power up AUX_START and wait 100 msec to charge the capacitors
4. Start PWM on driver and wait 100 msec
5. Stop AUX_START and power supply's are running.

The PWM for the 16 volt power supply is computed from the battery voltage and running with a fixed value to maintain an output voltage of 16 volt. The PWM is adjusted each 10 msec.

1.5 Charging

The BMS is controlling the charging and protecting against over charging. To control the charging the charge mosfet can be on/off and is only on when charging is active. When connecting a charger and the master detect the charger on CHARGER ACTIVE pin the mosfet is turn on and charging can begin. If the charge current is below 0.5 A for 30 sec charging is stopped and the charger has to be disconnected before it is re-enabled. If the charge current is above limit charging is stopped and will retry 3 times before locking. To unlock, remove wakeup signal and charger for 10 sec.

If battery temperature exceeds limit, charging is stopped until the temperature is 10° C. within limits, when automatically restarted.

If the BMS temperature exceeds limit, charging is stopped until the temperature is 10° C. within limits, when automatically restarted.

1.6 Discharging

The BMS is controlling discharging and protecting against deep discharge by switching off the discharge mosfet. If one or more cells are discharged, the discharge mosfet is switched of and the master will go into sleep. Discharge is only active if wakeup signal is active and the master will wakeup and power up the control circuits, but only if the cell voltages are within limits discharge is activated. Otherwise the master will go back into sleep again after 30 sec.

If the discharge current is above limit discharging is stopped and will retry 3 times before locking. To unlock, remove wakeup signal and charger for 10 sec.

If battery temperature exceeds limit, discharging is stopped until the temperature is 10° C. within limits, when automatically restarted.

If the BMS temperature exceeds limit, discharging is stopped until the temperature is 10° C. within limits, when automatically restarted.

1.7 Fuel Gauge

The fuel gauge is counting all currents going in and out of the battery. If the measured current value is below 0.3 A it is not counted into the fuel gauge. The fuel gauge value is not allowed to go below zero or above 105% of specified capacity.

1.8 Sleep

If wakeup signal and charger has been missing for 30 sec the BMS will go into sleep to minimize power consumption. The master wakeups when wakeup signal or charger is connected. If there is under voltage on one or more slaves, the master will only power up the control circuits and check the slave voltages and go back into sleep. To wakeup the master once more, first remove wakeup signal and reconnect.

1.9 Software Settings

Power Supply Settings

| Description | Value |
| --- | --- |
| Power supply start up voltage | 25.55 V |
| Power supply output voltage | 23 V |
| Power Supply Max PWM Pulse | 90% |

Current Settings

| Description | Value |
| --- | --- |
| Charge current max slow | 35 A |
| Charge current max slow time | 1 sec |
| Charge current max fast | 50 A |
| Charge current min | 0.5 A |
| Discharge current max slow | 150 A |
| Discharge current max slow time | 8 sec |
| Discharge current max fast | 250 A |
| Fuel gauge min detection | 0.3 A |
| Fuel gauge charge efficiency | 100% |
| Battery capacity | 80 Ah |

Voltage Settings

| Description | Value |
| --- | --- |
| Cell voltage min | 2.8 V |
| Cell voltage min reset | 3.3 V |
| Cell voltage max | 4.1 V |
| Cell voltage max reset | 4.0 V |
| Cell balance start voltage (single cell) | 4.0 V |
| Cell balance start voltage (average) | 3.8 V |
| Cell balance total power dispassion. | 27 W |

Temperature Settings

| Description | Value |
| --- | --- |
| BMS internal temperature max | 105° C. |
| BMS internal temperature reset | 90° C. |
| Battery charging temperature min | −10° C. |
| Battery charging temperature min reset | 0° C. |
| Battery charging temperature max | 50° C. |
| Battery charging temperature max reset | 40° C. |
| Battery discharging temperature min | −20° C. |
| Battery discharging temperature min reset | −10° C. |
| Battery discharging temperature max | 70° C. |
| Battery discharging temperature max reset | 60° C. |

2 Slave Version 1.03.01

The Slave is measuring the voltage of the cell and controlling the cell balance with information from the master.

2.1 Measurements

The slave measures the cell voltage each 9.5 ms and compute an average value after 50 measurements. The cell balancing is stopped while measuring to avoid wrong value caused by voltage drop in cables. The measurement is transmitted to the master. The measurement is calibrated in production via communication.

2.2 Cell Balance

The slave is making the cell balancing controlled values received from the master. The slave receives a voltage from the master, the difference between this value and measured value are multiplied and put in second. A fixed computed value is also received from the master and multiplied with the delta voltage used to compute the duty cycle for the cell balance PWM. If the cell voltage is lower than the received voltage fro the master the PWM is set to zero.

2.3 Communication

The slaves each the there own address for the master to recognize them and control the attery. The slave receive synchronise pulse and values for cell balance each second and the master gets voltage measurement and status information each second.

2.4 Sleep

If the communication from the master stops for more than 10 sec the slave is put into sleep and waiting for communication to start again.

3 Internal Communication

The master controls and monitors all the slaves by a communication between slaves and master. The master handles the communication and the slaves only respond when asked. The communication is build upon a QSART full duplex, running on 5 kb with 9 bit transmission. When the 9th bit is set, the byte is a command, otherwise its data.

When receiving a package, it is stored in a buffer to calculate if the checksum is the same as received. Only if the checksum matches it will use the package.

3.1 Start Byte/Address

In the beginning of all packages, there has to be a start byte containing the address of the slave Witch is receiving or transmitting. It is possible to connect up to 120 slaves to the master. The slaves will have there on address given in production for the master to access them. The addresses of the slaves will start from 1 and up to the number of slaves connected.

List of Addresses: (9th Bit Set)

| Value | Address |
|---|---|
| 0 | Global address |
| 1-120 | Slave address |

3.2 Command

The master sends packages to the slaves to give inform or give instructions. The command is always the first byte after the start byte.

There are always 3 commando bytes in one package (Start byte, Command and Checksum)

List of Commands: (9th Bit Set)

| Value | Name | Description |
|---|---|---|
| 0-120 | Start byte | Start byte and address of the slaves |
| 121 | Send info to master | Return data to master |
| 122 | Info from master | Average battery voltage |
| 123 | Error check | Check if one of the slaves has a error |
| 124 | Enter sleep-mode | Put the slaves into sleep-mode |
| 125 | Sync pulse | The master will transmit a sync pulse |
| 126 | Calibration | The Master transmit the real cell voltage and the slaves adjust the measured voltage |
| 128-255 | Checksum | |

3.3 Data

In some of the Packages it is necessary to transfer a few data bytes. When transmitting a data byte, the parity bit has to be low to indicate, it is a data byte and not a command. The receive buffer in the slaves is very small and it is only packages is possible to transmit or receive packages up to 16 bytes of data. When transmitting data values of 2 bytes, LSB is sent first.

3.4 Checksum

The checksum is the last byte of the packages and data coming after what is ignored only a new start byte in a new package is accepted. Since the check sum only calculate with 8 bits a value 25 is added for each parity bit. Every time the checksum has overflow the checksum is incremented one time. The checksum it self is not added to the checksum and not taken into calculation. The checksum can only have the value from 128 to 255, if the value is out of range two different values is added depending of the checksum value.

| Checksum | Value to Add |
|---|---|
| Parity | 25 |
| Each byte | 1 |
| Overflow | 1 |
| 0-122 | 133 (128 + 5) |
| 123-127 | 10 |
| 128-255 | No add |

| Ex 1: | Ex 2: | Ex 3: |
|---|---|---|
| Start byte: 15 | Start byte: 120 | Start byte: 15 |
| Command: 121 | Command: 121 | Command: 122 |
| Data: No | Data: No | Data: 189 |
| Data: No | Data: No | Data: 3 |
| Checksum: 186 | Checksum: 169 | Checksum: 134 |

Standard Master Package:

| Byte count | Name |
|---|---|
| 1 | Start byte/Address |
| 1 | Command |
| 2 | Data (Cell Balance Voltage) |
| 2 | Data (PWM Steps/Voltage) |
| 1 | Checksum |
| 7 | Total bytes |

Standard Slave Package:

| Byte count | Name |
|---|---|
| 1 | Start byte/Address |
| 1 | Data (Status byte) |
| 1 | Data (PWM value) |
| 2 | Data (Battery Voltage) |
| 1 | Checksum |
| 6 | Total Bytes |

The invention claimed is:

1. A modular battery management system for controlling and monitoring a plurality of battery cells connected in series in a battery connected to a load, the system comprising:
    a central controlling microcontroller;
    a plurality of cell balancing means and a plurality of slave sensing means, each of the cell balancing means and each of the slave sensing means being in communication with the central controlling microcontroller and operatively connected to an associated one of the battery cells in the plurality of battery cells; and
    a plurality of temperature sensors operable to monitor the temperature of each of the plurality of cell balancing means and each of the plurality of slave sensing means to determine if an excessive temperature has been reached;
    wherein the cell balancing means and the slave sensing means connected to each associated one of the plurality of battery cells are operable:
    (a) to measure a charging state of the associated one of the plurality of battery cells;

(b) when a maximum charging state is reached in at least one of the associated battery cells, to establish a shunt across the at least one of the associated battery cells that has reached the maximum charging state, thereby allowing a continued charging of the remaining battery cells in the plurality of battery cells;

(c) when the shunt is established, to communicate to the central controlling microcontroller a message representing that the maximum charging state has been reached in the at least one of the associated battery cells in which the maximum charging state has been reached;

(d) during discharging of the battery, to inform the central controlling microcontroller when a non-zero minimum voltage has been reached in the associated one of the battery cells so as to cause the central controlling microcontroller to disconnect all the cells in the plurality of cells from the load in order to prevent further discharging of the associated one of the battery cells in which the non-zero minimum voltage has been reached to a cell-ruining voltage below the non-zero minimum voltage; and (e) shut down charging of the battery when the excessive temperature is reached;

wherein each of said cell balancing means is configured to establish the shunt in response to a signal from the slave sensing means when the respective slave sensing means has measured a maximum voltage across the at least one of the associated battery cells that has reached the maximum charging state; and wherein each of the plurality of slave sensing means is further operatively connected to the central controlling microcontroller via a common data bus, whereby a continuous charging of the remaining battery cells is controlled by the central controlling microcontroller.

2. The modular battery management system according to claim 1, wherein the common data bus is separated from the central controlling microcontroller by an isolation stage and a coupling stage.

3. The modular battery management system according to claim 1, wherein each of the plurality of temperature sensors is further operable to measure the temperature of an associated one of the battery cells, each of the plurality of temperature sensors being operatively connected to a respective slave sensing means, wherein the respective slave sensing means is configured for reducing a charging current to the associated one of the battery cells in response to the measured temperature of the associated one of the battery cells.

4. The modular battery management system according to claim 1, further comprising a microcontroller temperature sensor operable to monitor the temperature of the central controlling microcontroller, thereby allowing the central controlling microcontroller to shut down charging or discharging of the plurality of battery cells when an excessive temperature is reached.

5. The modular battery management system according to claim 1, further comprising means for shutting down charging and discharging of the plurality of battery cells controlled by the central controlling microcontroller in the case of an overload or a short circuit of the battery.

6. The modular battery management system according to claim 1, further comprising current monitoring means, including a shunt resistor in series with the plurality of battery cells, for monitoring current through the plurality of battery cells.

7. The modular battery management system according to claim 1, further comprising a fuse for protection in case of an overload or a short circuit of the battery.

8. The modular battery management system according to claim 1, further comprising a power supply unit operable to supply power to the central controlling microcontroller.

9. The modular battery management system according to claim 1, further comprising a fuel gauge operable to monitor a charge capacity of the battery.

10. The modular battery management system according to claim 1, wherein each of the plurality of cells has a positive terminal and a negative terminal, and where the shunt is established by connecting the positive terminal to the negative terminal through a power resistor and a fast-switching transistor.

11. The modular battery management system according to claim 10, wherein pulse-width modulation is used to provide adjustable current through the power resistor.

12. The modular battery management system according to claim 1, wherein the battery is a lithium-ion battery.

13. The modular battery management system according to claim 1, wherein the minimum voltage is 2.8V.

14. A method for controlling and monitoring a plurality of individual battery cells connected in series in a battery connected to a load, each of the individual battery cells having a positive terminal and a negative terminal, each of the individual battery cells being operatively connected to an associated one of a plurality of slave sensing means, the method comprising:

(a) during charging of the battery:
  (i) measuring a voltage across each individual cell by the associated one of the plurality of slave sensing means;
  (ii) shunting any individual cell in which the voltage measured by the associated one of the plurality of slave sensing means has reached a maximum voltage, the shunting being performed by shorting the positive and negative terminals of the individual cell through a resistor and a switching transistor, thereby bypassing the individual cell in which the maximum voltage has been reached to allow continued charging of the remaining battery cells in the plurality of individual battery cells;
  (iii) sensing the temperature of each of the plurality of the slave sensing means; and
  (iv) shutting down the charging of the battery when the temperature of any of the slave sensing means exceeds a predetermined temperature;

(b) during discharging of the battery:
  measuring the voltage across each individual cell by the associated one of the slave sensing means until the measured voltage reaches a non-zero minimum voltage in one or more individual cells, at which time all of the plurality of individual cells in the battery are removed from the load to prevent the one or more cells in which the measured voltage has reached the non-zero minimum voltage from further discharging to a cell-ruining voltage below the non-zero minimum voltage;

(c) wherein the shunting of each of the individual cells during charging is controlled by the associated one of the plurality of slave sensing means, wherein continued charging of the remaining cells in the battery is controlled by a central controlling microcontroller, which is operatively connected to each of the plurality of slave sensing means via a common data bus, and wherein removal of all the plurality of individual cells in the battery from the load during discharging is performed by the central controlling microcontroller.

15. The method according to claim 14, further comprising:
   (d) measuring the temperature of one or more individual cells; and
   (e) reducing charging current to any of the individual cells for which a measured temperature exceeds a predetermined maximum temperature.

16. The method according to claim 14, where the charging and the discharging of the individual cells is interrupted in case of an overload or a short circuit of the battery.

17. The method according to claim 14, further comprising the step of separating the common data bus from the central controlling microcontroller by an isolation stage and a coupling stage in order to prevent the central controlling microcontroller from being affected by high voltages.

18. The method according to claim 14, further comprising the steps of:
   (d) monitoring the temperature of the central controlling microcontroller, and
   (e) shutting down the charging or discharging if the temperature of the central controlling microcontroller reaches a predetermined temperature.

19. The method of claim 14, wherein the battery is a lithium-ion battery.

20. The method according to claim 14, wherein the minimum voltage is 2.8V.

* * * * *